United States Patent
Tam et al.

(10) Patent No.: US 8,238,891 B1
(45) Date of Patent: Aug. 7, 2012

(54) METHOD AND SYSTEM FOR INTERACTIVE DELIVERY OF DATA CONTENT TO MOBILE DEVICES

(75) Inventors: Wendy Tam, Austin, TX (US); Hin Hang Tsang, Kowloon (CN); Pak Wai Cheung, Kowloon (CN); Kin Ming Ho, Sham Shui Po (CN); Ki Tat Chung, Tsuen Wan (CN)

(73) Assignee: Wendy W. Tam, Austin, TX (US)

( * ) Notice: Subject to any disclaimer, the term of this patent is extended or adjusted under 35 U.S.C. 154(b) by 1103 days.

(21) Appl. No.: 12/113,737

(22) Filed: May 1, 2008

(51) Int. Cl.
*H04M 3/00* (2006.01)
*H04W 4/00* (2009.01)

(52) U.S. Cl. ........................ 455/418; 455/446

(58) Field of Classification Search ............... 455/414.3, 455/466, 556.1, 54.1, 456.1–456.6, 414.4, 455/414.1, 418, 412.1; 370/259, 401, 474, 370/468, 351–356, 473; 379/67.1, 88, 89, 379/202, 67; 707/10, E17.01; 709/206
See application file for complete search history.

(56) References Cited

U.S. PATENT DOCUMENTS

| | | | |
|---|---|---|---|
| 6,892,217 B1 * | 5/2005 | Hanmann et al. | 709/200 |
| 6,977,921 B1 * | 12/2005 | Dolan | 370/352 |
| 6,978,417 B1 * | 12/2005 | Kohn et al. | 715/202 |
| 7,216,290 B2 * | 5/2007 | Goldstein et al. | 715/234 |
| 7,890,852 B2 * | 2/2011 | Wason | 715/234 |
| 2005/0181766 A1 * | 8/2005 | Rooke et al. | 455/412.1 |
| 2007/0037557 A1 * | 2/2007 | Shao et al. | 455/414.1 |
| 2007/0242626 A1 * | 10/2007 | Altberg et al. | 370/259 |
| 2008/0019390 A1 * | 1/2008 | Singh et al. | 370/465 |
| 2009/0017804 A1 * | 1/2009 | Sarukkai et al. | 455/414.3 |
| 2009/0209286 A1 * | 8/2009 | Bentley et al. | 455/556.1 |
| 2010/0150397 A1 * | 6/2010 | Handley et al. | 382/100 |
| 2011/0055686 A1 * | 3/2011 | Wason | 715/234 |

OTHER PUBLICATIONS

ETSI, "Digital cellular telecommunications system; Alphabets and language-specific information", ETSI TS 100 900 v7.2.0, Jul. 1999, p. 1-20.
ETSI, "Digital cellular telecommunications system; Technical realization of the Short Message Services (SMS)", ETSI TS 100 901 v7.4.0, Dec. 1999, p. 1-121.

* cited by examiner

*Primary Examiner* — Melody Mehrpour
(74) *Attorney, Agent, or Firm* — Silicon Valley Patent Group; Thomas Chan

(57) ABSTRACT

Method and system for interactive delivery of data content to mobile devices are disclosed. The method includes receiving a rich media message to be transmitted to a mobile device, where the rich media message includes multimedia data, determining a mode of data communication of the mobile device, parsing the rich media message into one or more text SMS (short message service) messages in response to a determination that the mobile device is capable of processing only text SMS messages, and transmitting the one or more text SMS messages to the mobile device.

23 Claims, 15 Drawing Sheets

METHOD AND SYSTEM FOR INTERACTIVE DELIVERY OF DATA CONTENT TO MOBILE DEVICES

FIELD OF THE INVENTION

The present invention generally relates to the field of data communication. In particular, the present invention relates to a method and system for interactive delivery of data content to mobile devices.

BACKGROUND OF THE INVENTION

The recent proliferation of electronic devices for communication, information management and recreation has taken routine computing power far away from the desk-bound personal computer. Users are using devices such as cell phones, camera phones, and personal digital assistants (PDAs), not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the level of personalization to the users.

Despite the increased functionalities of the mobile devices, there exist significant challenges for businesses to deliver advertisements or other commercial information to the mobile users. One of the problems is that the mobile users have to pay for the delivery of the advertisements because they are being charged for the data delivery when the advertisement messages are sent to the mobile users. Another problem is that many of the advertisements are created with multimedia data content, and yet not all mobile devices are equipped to receive such multimedia data content unless the mobile users have subscribed to certain data plans with their cellular phone carriers.

Yet another problem is that information is typically pushed onto the mobile devices, whether the mobile users want to receive the information or not. A drawback of this push method of communication is that it is disruptive to the mobile users because it frequently demands for users' attention. The users may be overwhelmed with information and most of the information received may be regarded as spam data. In the event the mobile users would like to get information, such as checking stock prices or sports scores. In this form of communication, information is pulled by the users, such as in the form of navigating, browsing, or checking for information update on the Internet. One drawback of this mode of communication is that the users have to devote the time and effort to navigate through multiple links or web pages in order to retrieve the information, which is time consuming and sometimes the information interested to the users are not yet available, for example, the final score is not available because the game has not yet finished.

Therefore, there is a need for method and system for communicating information with a mobile device that address the drawbacks of conventional methods described above. In particular, there is a need for interactive delivery of data content to mobile devices. And there is a need for delivering information the users want and at the same time reducing the disruption and the time in obtaining such information.

SUMMARY

The present invention generally relates to the field of data communication. In particular, the present invention relates to a method and system for interactive delivery of data content to mobile devices.

In one embodiment, a system for interactive delivery of data content to mobile devices includes a mobile originated message processing module configured to receive messages from mobile devices via at least one of HTTP, binary SMS, and text SMS formats, a mobile terminated message dispatching module configured to transmit messages to mobile devices via at least one of binary SMS and text SMS formats, an agent originated message processing module configured to receive messages from content or service providers via the HTTP format, an agent terminated message dispatching module configured to transmit messages to the content or service providers via the HTTP format, and a media message router module configured to bridge communications among the mobile originated message processing module, the mobile terminated message dispatching module, the agent originated message processing module, the agent terminated message dispatching module, and a database server.

In another embodiment, a method for interactive delivery of data content to mobile devices includes receiving a rich media message to be transmitted to a mobile device, where the rich media message includes multimedia data, determining a mode of data communication of the mobile device, parsing the rich media message into one or more text SMS (short message service) messages in response to a determination that the mobile device is capable of processing only text SMS messages, and transmitting the one or more text SMS messages to the mobile device.

In yet another embodiment, a computer program product for interactive delivery of data content to mobile devices, which has a medium storing executable program code. The computer program product includes code for receiving a rich media message to be transmitted to a mobile device, where the rich media message includes multimedia data, code for determining a mode of data communication of the mobile device, code for parsing the rich media message into one or more text SMS messages in response to a determination that the mobile device is capable of processing only text SMS messages, and code for transmitting the one or more text SMS messages to the mobile device.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DESCRIPTION OF EMBODIMENTS

Methods and systems are provided for interactive delivery of data content to mobile devices. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
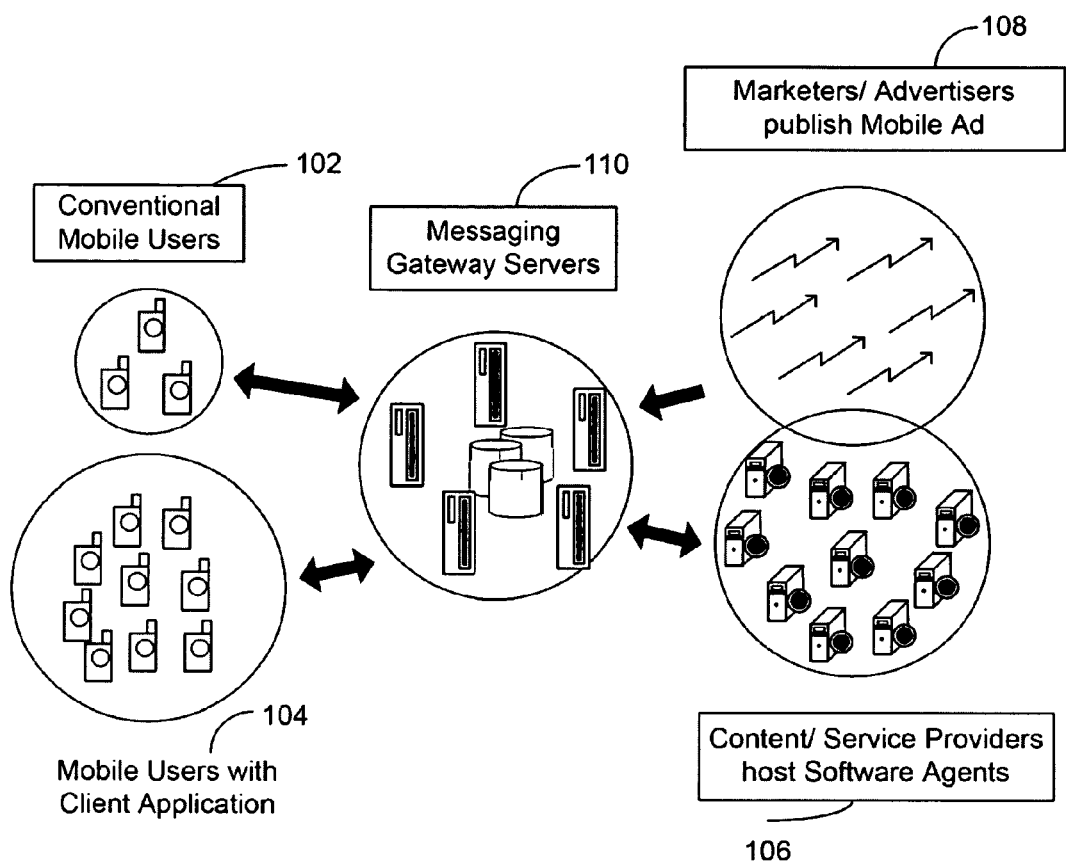
FIG. 1 illustrates an exemplary architectural implementation of a rich content messaging service according to embodiments of the present invention.

FIG. 1 illustrates an exemplary architectural implementation of a rich content messaging service according to embodiments of the present invention. As shown in the example of FIG. 1, the rich content messaging service may involve users with conventional mobile devices 102 having limited functionalities (also referred to as the conventional mobile users), users with mobile devices having client application installed 104 (also referred to as users with client application), content/service providers 106, and advertisers/marketers 108. The users, content/service providers, and advertisers/marketers interact with one another through a group of messaging gateway servers 110. According to embodiments of the present disclosure, a client application may consist of a set of post-factory installed software programs that provide additional features to a mobile device. Such client application is typically downloaded from the Internet or wirelessly transmitted to the mobile device. One example is a client application which converts a text-only conventional mobile phone to a mobile phone that is able to transmit and receive multimedia messages.

According the exemplary architectural implementation of FIG. 1, the conventional mobile users 102 is a group of users without installation of client applications. This group of users may compose messages with a build-in SMS composer from the conventional mobile phone. Note that SMS (Short Message Service) is a communications protocol allowing the interchange of short text messages between mobile telephone devices. The SMS technology has facilitated the development and growth of text messaging. SMS as used on modern handsets was originally defined as a means of sending messages of up to 160 characters (in each message and the messages may be concatenated), to and from mobile handsets. Since then, support for the service has expanded to include alternative mobile standards such as ANSI CDMA networks and Digital AMPS, as well as satellite and landline networks. Typical SMS messages are mobile-to-mobile text messages.

In the scenario of communications between conventional mobile devices 102 and the messaging gateway servers 110, messages are sent from the conventional mobile devices 102 to the messaging gateway servers 110 with standard SMS in plain text. Similarly, the messages are delivered from the messaging gateway server 110 to the conventional mobile devices 102 with standard SMS in plain text. In this approach, received messages are saved in the SMS inbox of the conventional mobile devices 102.

In the scenario of communications between mobile devices having client applications installed 104 and the messaging gate servers 110, these users may compose messages using the installed client application. For example, for users without appropriate data plan, messages can be sent from the mobile devices 104 to the messaging gateway server by means of binary SMS. For users with appropriate data plan or WiFi connectivity, messages can be sent from the mobile devices 104 to the messaging gateway servers 110 by means of HTTP (hypertext transfer protocol) Post. In this approach, sent and received messages are saved in the mobile client application. With the use of client application, users may benefit from the full experience of rich media message, such as interactivity, contents, and layout with color and image.

Note that Hypertext Transfer Protocol (HTTP) is a communications protocol for the transfer of information on intranets and the World Wide Web. Its original purpose was to provide a way to publish and retrieve hypertext pages over the Internet. HTTP defines eight methods (sometimes referred to as "verbs") indicating the desired action to be performed on the identified resource. The method Head asks for the response identical to the one that would correspond to a GET request, but without the response body. This is useful for retrieving meta-information written in response headers, without having to transport the entire content. The method Get requests a representation of the specified resource. By far the most common method used on the Web today. Should not be used for operations that cause side-effects (using it for actions in web applications is a common misuse). See 'safe methods' below. The method Post submits data to be processed (e.g. from an HTML form) to the identified resource. The data is included in the body of the request. This may result in the creation of a new resource or the updates of existing resources or both. The method Put uploads a representation of the specified resource. The method Delete deletes the specified resource. The method Trace echoes back the received request, so that a client can see what intermediate servers are adding or changing in the request. The method Option returns the HTTP methods that the server supports for specified URI. This can be used to check the functionality of a web server by requesting '*' instead of a specific resource. The method Connect converts the request connection to a transparent TCP/IP tunnel, usually to facilitate SSL-encrypted communication (HTTPS) through an unencrypted HTTP proxy.

The content/service providers 106 are a group of users and organizations publishing information or providing services on the web. This group of people can leverage rich content messaging service to delivery information and services to the mobile users. Content/service providers may develop and host software agents and may connect with the messaging gateway servers 110 remotely. In this approach, messages are sent from software agents to the messaging gateway server by means of HTTP Post. Messages are delivered from the messaging gateway server 110 to the software agents by means of HTTP callback.

The advertisers/marketers are a group of entities who may want to advertise their products or services to the mobile users using the messaging channel of the rich content messaging service. Advertisements are delivered through rich content messaging service by submitting through an advertisement publishing mechanism. In this approach, the messaging gateway servers 110 attach appropriate advertisements to the corresponding messages that are to be delivered to the users, even to the conventional mobile devices where client applications have not been installed.

The messaging gateway servers 110 store information about the mobile users and remote software agents (also referred to as remote agents or agents for short). In addition, the messaging gateway servers 110 process messages from the mobile users to the remote agents, route messages to appropriate mobile users and remote agents, and dispatch messages to mobile users and remote agents.

Figure 2:
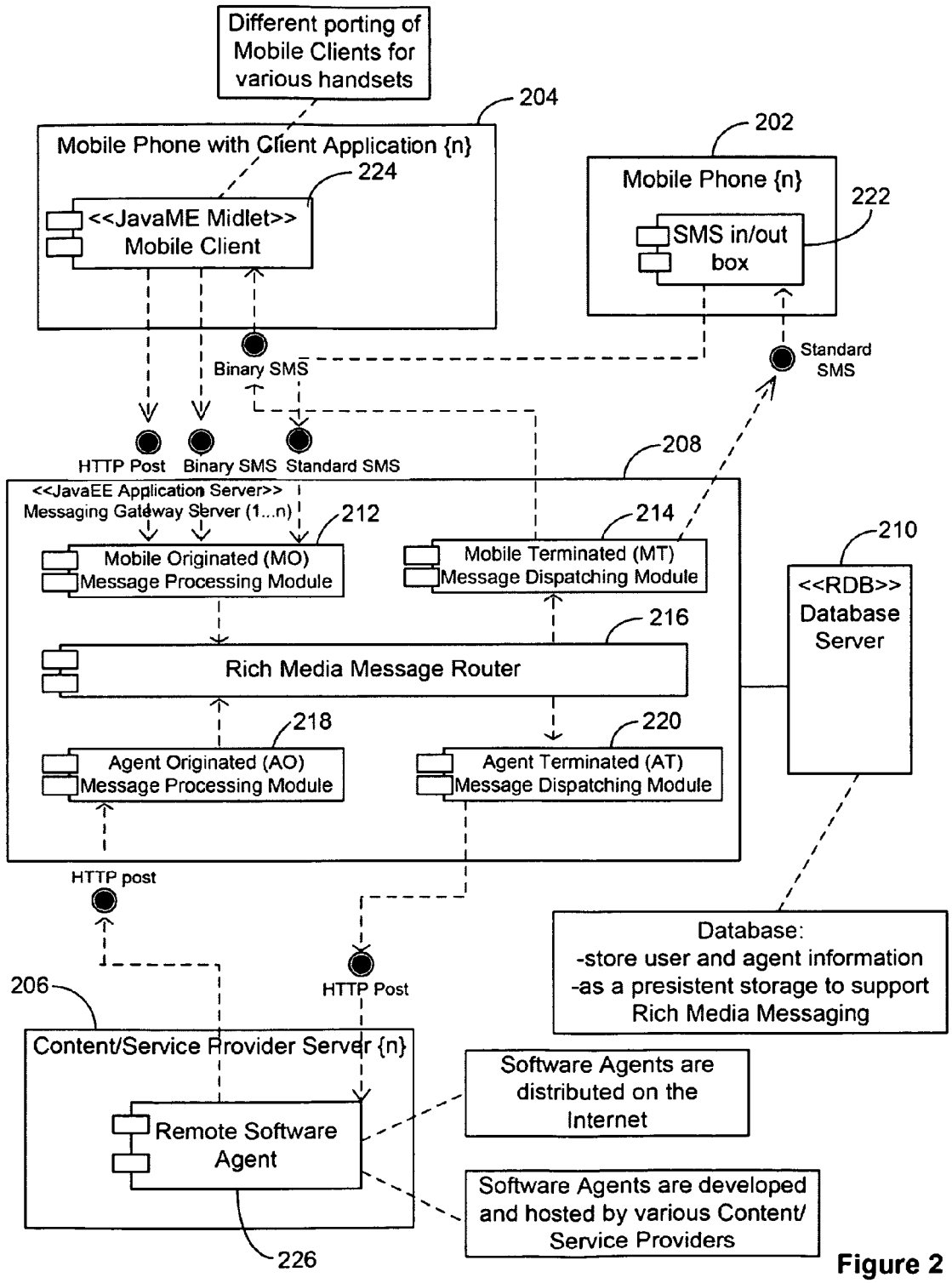
FIG. 2 illustrates an exemplary implementation of a rich content messaging service flow diagram according to embodiments of the present invention.

FIG. 2 illustrates an exemplary implementation of a rich content messaging service flow diagram according to embodiments of the present invention. As shown in FIG. 2, the rich content messaging service flow diagram includes conventional mobile phones (e.g. mobile devices without client application installed) 202, mobile devices with client application 204, and content/service provider servers 206. The conventional mobile phones 202 and mobile devices with client application 204 communicate with the content/service provider servers via one or more messaging gateway servers 208, which is supported by one or more database servers 210. The one or more database servers store information about users and software agents (also referred to as agents for short), and act as persistent storage for supporting rich media messaging. Each messaging gateway server 208 may include a mobile originated (MO) message processing module 212, a mobile terminated (MT) message dispatching module 214, a rich media message router 216, an agent originated (AO) message processing module, and an agent terminated (AT) message dispatching module 220. Details about each of the mobile originated (MO) message processing module 212, the mobile terminated (MT) message dispatching module 214, the rich media message router 216, the agent originated (AO) message processing module, and the agent terminated (AT) message dispatching module 220 are discussed in the following sections. Each mobile device 202 may include an SMS in/out box module 222 for receiving standard SMS messages from the mobile terminated message dispatching module 214 or sending standard SMS messages to the mobile originated message processing module 212 of the messaging gateway servers 208. While each mobile device with client application 204 may include a mobile client module 224 for receiving binary SMS messages from the mobile terminated message dispatching module 214 or sending binary SMS messages or HTTP Post messages to the mobile originated message processing module 212. Each content/service provider server 206 may include a remote software agent module 226 for receiving HTTP Post messages from the agent terminated message dispatching module 220 or sending HTTP Post messages to the agent originated message processing module 218. The remote software agent module 226 includes software agents that may be developed and hosted by content/service providers, and which may be distributed on the Internet.

There are various forms of message exchange: 1) user to user, where a user may send a message to another user; 2) user to agent, where a user may send a message to an agent; 3) agent to user, where an agent may send a message to a user; 4) agent to agent, where one agent may send a message to another agent; 5) agent (on behalf of user) to user, where an agent may send a message on behalf of one user to another user; and 6) agent (on behalf of user) to agent, where one agent may send a message on behalf of a user to another agent. In various embodiments of the present disclosure, there is no precondition for agent to agent message exchange. An agent may always send a message to another agent. A precondition for a user to user message exchange may depend on whether a user formed a friendship (mutual trust) with another user. A precondition for a user to an agent message exchange may depend on whether the agent is belonging to the user. Preconditions for an agent to a user message exchange may depend on whether the agent is belonging to the user and the user granted the agent with a privilege of "send message to me." Preconditions for agent (on behalf of user) to user message exchange may depend on whether the user formed friendship (mutual trust) with another user, and the agent is belonging to the user, and the user granted the agent with a privilege of "send message to my friends." Preconditions for agent (on behalf of user) to agent message exchange may depend on whether both of the agents belong to the user, and the user granted the agent with a privilege of "send message to my agents." With the fulfillment of the precondition(s), the above mentioned message exchanges may proceed.

Figure 3:
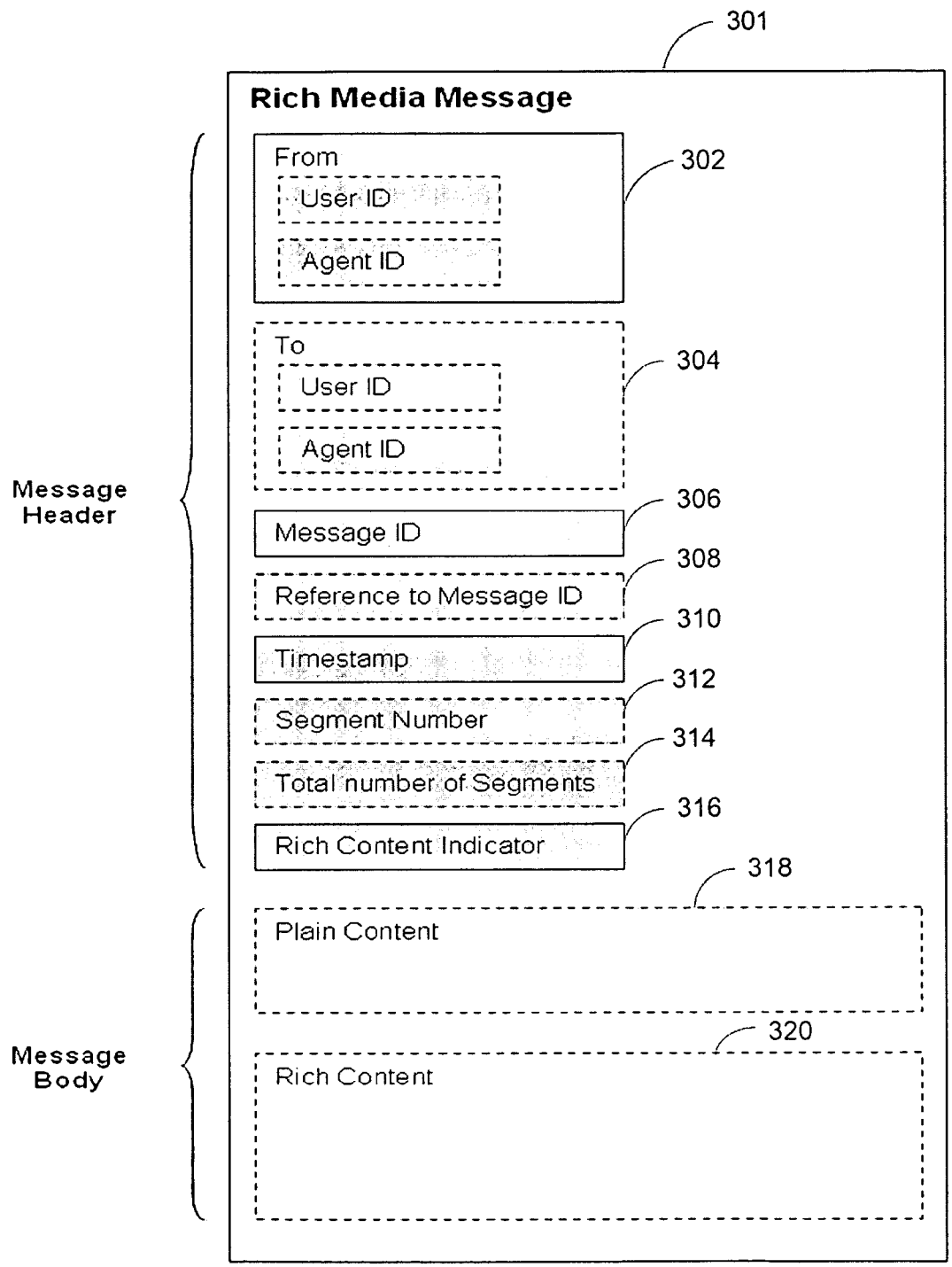
FIG. 3 illustrates an example of a rich media message according to embodiments of the present invention.

FIG. 3 illustrates an example of a rich media message according to embodiments of the present invention. In this example, a rich media message 301 includes a message header and a message body. The message header includes a FROM section 302, a TO section 304, a message ID (identifier) 306, a reference to message ID 308, a timestamp 310, a segment number 312, a total number of segments 314, and a rich content indicator 316. The message body includes a plain content section 318, and a rich content section 320. The FROM section 302 further includes a User ID that identifies the user from whom the message was sent, and an agent ID that identifies the agent from whom the message was sent. Similarly, the TO section 304 further includes a User ID that identifies the user to whom the message was sent, and an agent ID that identifies the agent to whom the message was sent. The message ID 306 contains a unique identifier for each message. The reference to message ID 308 contains an identifier of a related message, which is used for mapping of a reply message. The timestamp 310 contains a value representing the time the message was created. The segment number 312 is an index number of a segment for a parsed message. The total number of segments 314 indicates the total number of segments for a parsed message. The rich content indicator 316 indicates whether the message contains rich content. The plain content 318 stores a message body in plain text, and the rich content 320 stores a message body encoded in rich content model as further described below.

According to embodiments of the present disclosure, rich content module may be encoded in binary optimized format. Binary serialization of rich content model is used for transmission between a mobile client and a message gateway server. It may also be used as data format for persistent storage in the database server of the messaging gateway server. The following sections further describe the components of the rich content module with binary serialization format.

In other embodiments of the present disclosure, rich content model may be encoded in XML according to an XML schema. XML serialization of rich content model may be used for remote interfacing between a message gateway server and remote software agents. The following is an example of rich content model encoded in XML format according to embodiments of the present disclosure:

<RichContent xmlns="http://www.airgini.com/congee/rich-content" xmlns:xsi="http://www.w3.org/2001/XMLSchema-instance">
  <BorderColor>#808080</BorderColor>
  <Component xsi:type="rich:Text" xmlns:rich="http://www.airgini.com/congee/rich-content">
    <FontSize>Large</FontSize>
    <FontStyle>Bold</FontStyle>
    <Text>Touch comes to iPod</Text>
  </Component>
  <Component xsi:type="rich:LineBreak" xmlns:rich="http://www.airgini.com/congee/rich-content"/>
  <Component xsi:type="rich:Text" xmlns:rich="http://www.airgini.com/congee/rich-content">
    <Color>#808080</Color>
    <Text>8 GB and 16 GB models starting at $299</Text>
  </Component>
  <Component xsi:type="rich:LineBreak" xmlns:rich="http://www.airgini.com/congee/rich-content"/>
  <Component xsi:type="rich:Text" xmlns:rich="http://www.airgini.com/congee/rich-content">
    <Color>#ff0000</Color>
    <Action>Call</Action>
    <ActionString>+85297786251</ActionString>
    <Text>Call 1-800-MY-APPLE to buy</Text>
  </Component>
  <Component xsi:type="rich:LineBreak" xmlns:rich="http://www.airgini.com/congee/rich-content"/>
  <Component xsi:type="rich:Image" xmlns:rich="http://www.airgini.com/congee/rich-content">
    <BinaryResource>89504E470D0A1A0A0000000D49484452000001BD0000016408020000003B7B . . . </BinaryResource>
    <Alignment>Center</Alignment>
    <Label>iPod touch</Label>
  </Component>
  <Component xsi:type="rich:LineBreak" xmlns:rich="http://www.airgini.com/congee/rich-content"/>
  <Component xsi:type="rich:ImageCollection" xmlns:rich="http://www.airgini.com/congee/rich-content">
    <Alignment>Center</Alignment>
    <Label>web apps</Label>
    <Image>
      <BinaryResource>89504E470D0A1A0A0000000D49484452000000090000001220802000000099 . . . </BinaryResource>
    </Image>
    <Image>
      <BinaryResource>89504E470D0A1A0A0000000D49484452000000090000001220802000000099 . . . </BinaryResource>
    </Image>
    <Image>
      <BinaryResource>89504E470D0A1A0A0000000D49484452000000090000001220802000000099 . . . </BinaryResource>
    </Image>
    <Image>
      <BinaryResource>89504E470D0A1A0A0000000D49484452000000090000001220802000000099 . . . </BinaryResource>
    </Image>
    <Image>
      <BinaryResource>89504E470D0A1A0A0000000D49484452000000090000001220802000000099 . . . </BinaryResource>
    </Image>
  </Component>
</RichContent>

Referring back to FIG. 2, the mobile originated message processing module 212 includes three interfaces for receiving rich media message from mobile devices or mobile clients: 1) binary encoded message through HTTP Post; 2) binary encoded message through binary SMS (MO); and 3) text message through standard SMS (MO). After receiving a rich media message, the mobile originated message processing module 212 decodes the message as a unified message model and passes it to the rich media message router 216. Then, the rich media message router 216 may route the message to a specific user or agent according to the message header.

Figure 4A:
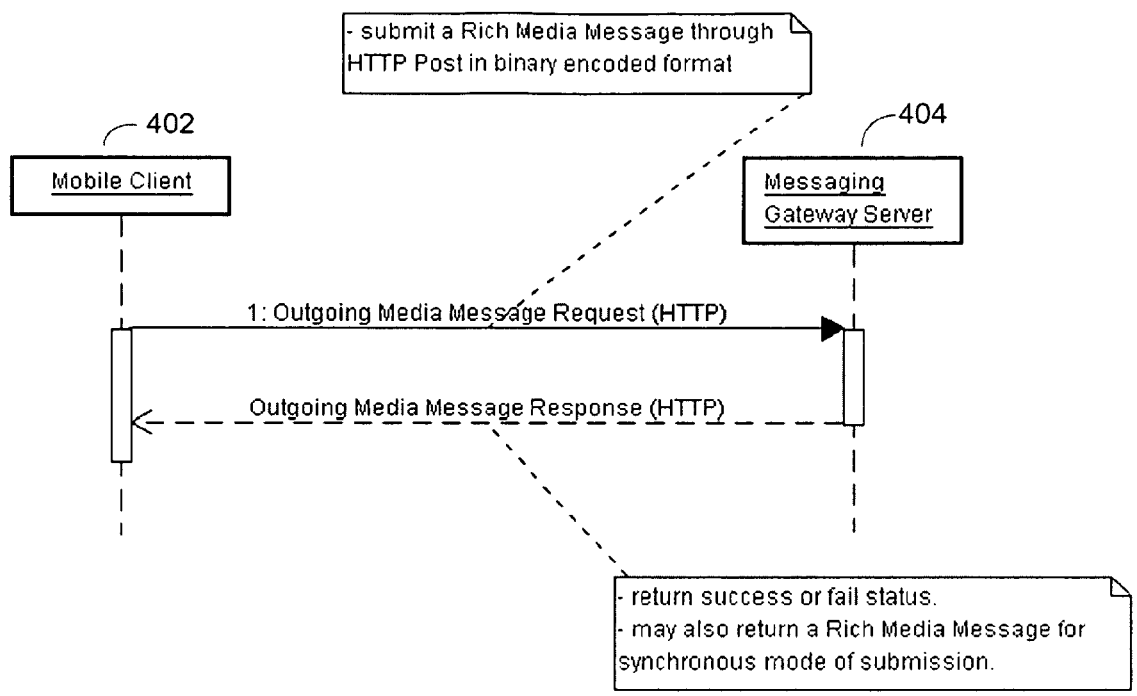
FIG. 4a illustrates a method for processing a binary encoded message through HTTP Post according to embodiments of the present invention.

FIG. 4*a* illustrates a method for processing a binary encoded message through HTTP Post according to embodiments of the present invention. In this exemplary method, a rich media message from a mobile client 402 may be submitted to a messaging gateway server 404 by means of an outgoing rich media message request, where the mobile client 402 submits a rich media message through HTTP Post in binary encoded format. In response, the messaging gateway server 404 returns an outgoing rich media message response, where the messaging gateway server 404 returns a success or fail status. For asynchronous mode of submission, only status may be returned from the messaging gateway server 404. For synchronous mode of submission, a rich media message may also be returned from the messaging gateway server 404.

Figure 4B:
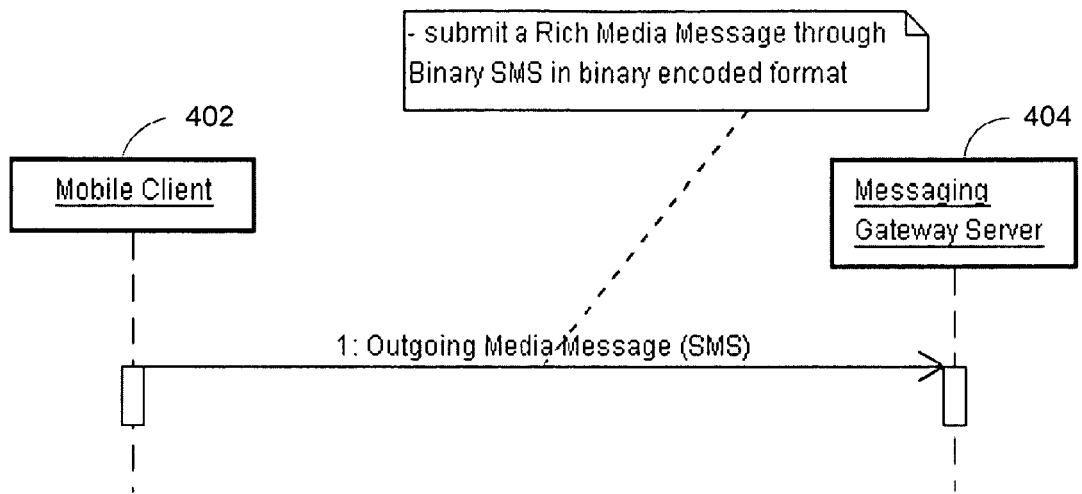
FIG. 4b illustrates a method for processing a binary encoded message through binary SMS according to embodiments of the present invention.

FIG. 4b illustrates a method for processing a binary encoded message through binary SMS according to embodiments of the present invention. In this exemplary method, a rich media message from the mobile client 402 may be submitted to the messaging gateway server 404 according to the form of an outgoing rich media message (SMS), where the mobile client 402 submits a rich media message through binary SMS in binary encoded format. With the use of SMS, the submission can be in an asynchronous mode. There is no response message returned from messaging gateway server 404.

Figure 4C:
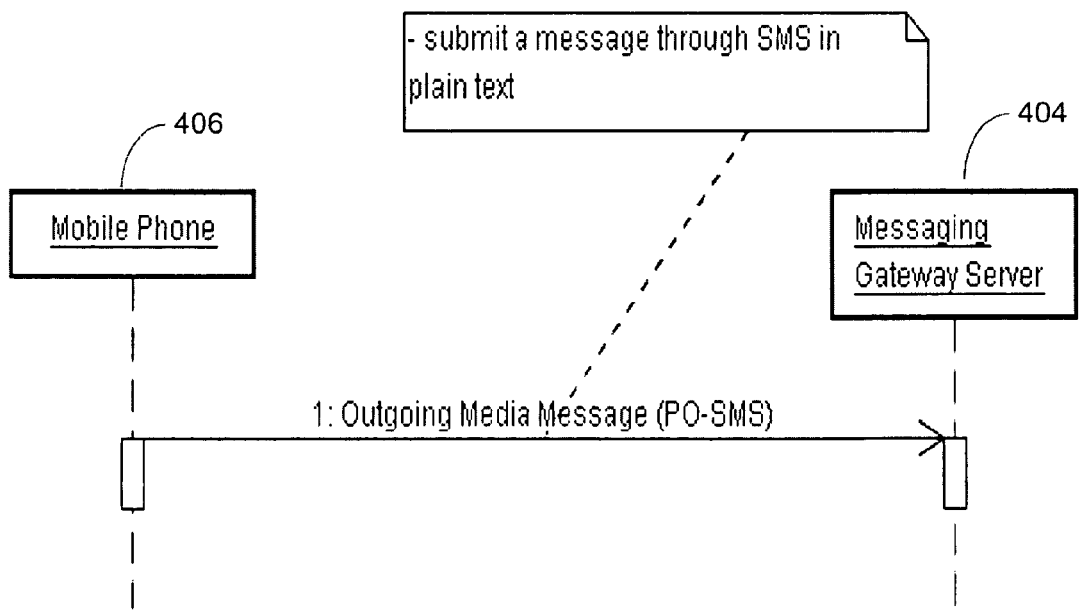
FIG. 4c illustrates a method for processing a text message through standard SMS according to embodiments of the present invention.

FIG. 4c illustrates a method for processing a text message through standard SMS according to embodiments of the present invention. In this exemplary method, with the use of a build-in SMS composer of the mobile phone 406, composed message from the mobile phone 406 may be sent to the messaging gateway server 404 by means of an outgoing rich media message (PO-SMS), where the mobile phone 406 submits a message through SMS in plain text. With the use of SMS, the submission can be in an asynchronous mode. There is no response message returned from the messaging gateway server 404.

Referring back to FIG. 2, the mobile terminated message dispatching module 214 has two interfaces to send rich media messages to the mobile phone with client application 204, namely via binary encoded message through binary SMS (MT) or via plain message through standard SMS (MT). After receiving of a rich media message from the rich media message router 216, the mobile terminated message dispatching module 214 encodes the rich media message using an unified message model. Based on the user's configurations, the message may be dispatched to the mobile client 204 in binary SMS or to the mobile phone 202 in standard SMS.

Figure 5A:
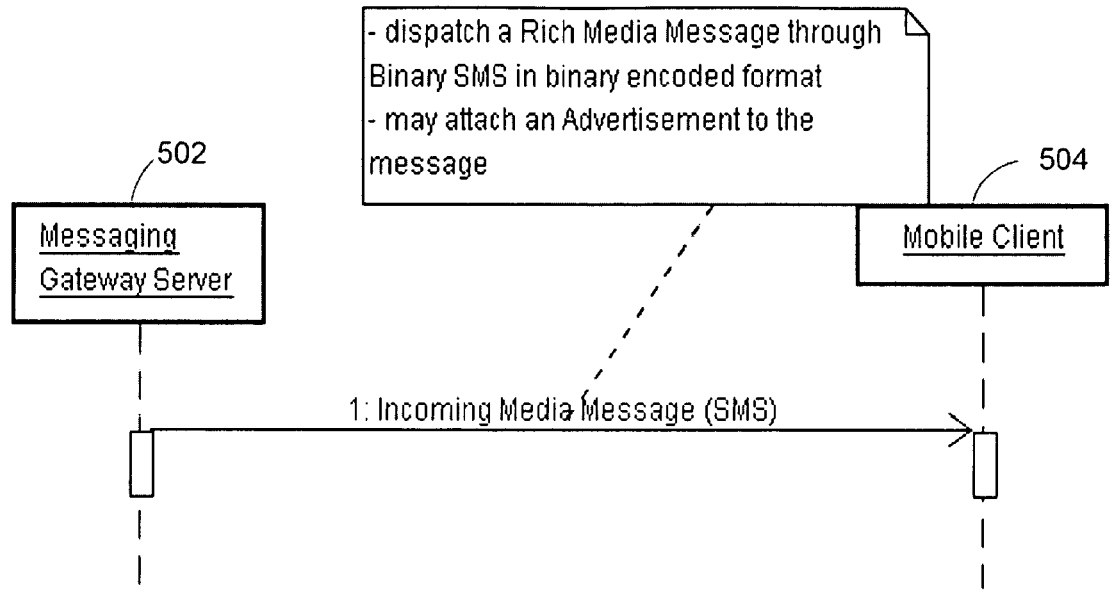
FIG. 5a illustrates a method for processing a binary encoded message through binary SMS (MT) according to embodiments of the present invention.

FIG. 5a illustrates a method for processing a binary encoded message through binary SMS (MT) according to embodiments of the present invention. In this exemplary method, a rich media message from a messaging gateway server 502 may be dispatched to a mobile client 504 according to the form of an incoming media message (SMS), where the messaging gateway server 502 dispatches a rich media message through binary SMS in binary encoded format. The message may then be encoded in 8 bit binary format with the attachment, such as an advertisement.

Figure 5B:
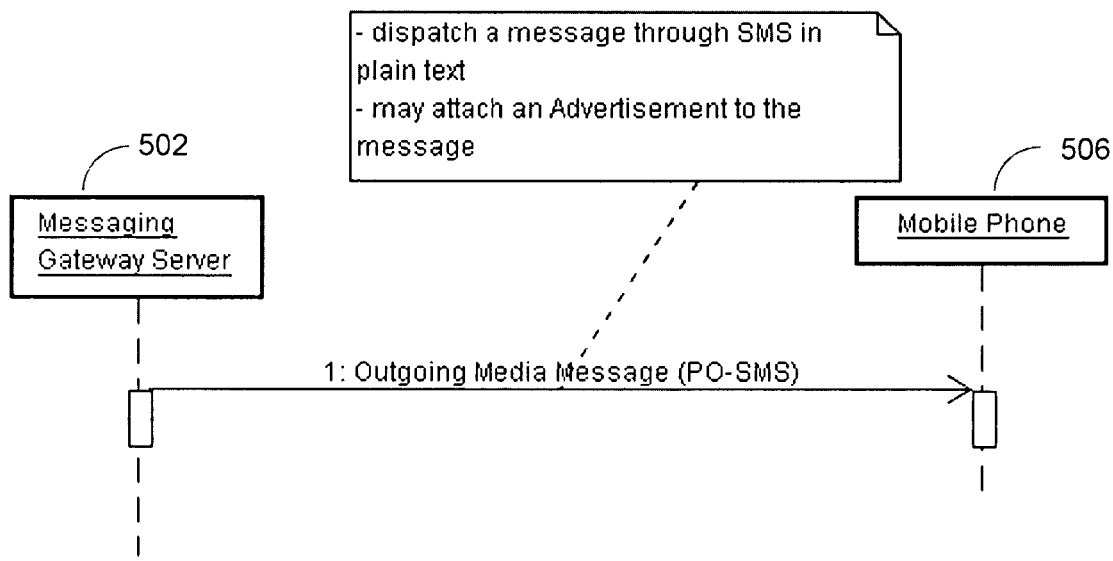
FIG. 5b illustrates a method for processing a plain message through standard SMS (MT) according to embodiments of the present invention.

FIG. 5b illustrates a method for processing a plain message through standard SMS (MT) according to embodiments of the present invention. In this exemplary method, a rich media message from the messaging gateway server 502 may be dispatched to the mobile phone 506 according to the form of an incoming rich media message (PO-SMS), where the messaging gateway server 502 dispatches a message through SMS in plain text. The message may then be encoded in GSM7 bit or UCS2 format with the attachment, such as an advertisement.

Referring back to FIG. 2, the agent originated (AO) message processing module 218 has an interface to receive a rich media message from a remote software agent 226 of the content/service provider server 206 by means of an XML encoded message through HTTP Post. After receiving of the rich media message, the agent originated message module 218 decodes the rich media message and passes it to the rich media message router 216. The rich media message router 216 can then route the rich media message to specific user or agent according to the message header.

Figure 6A:
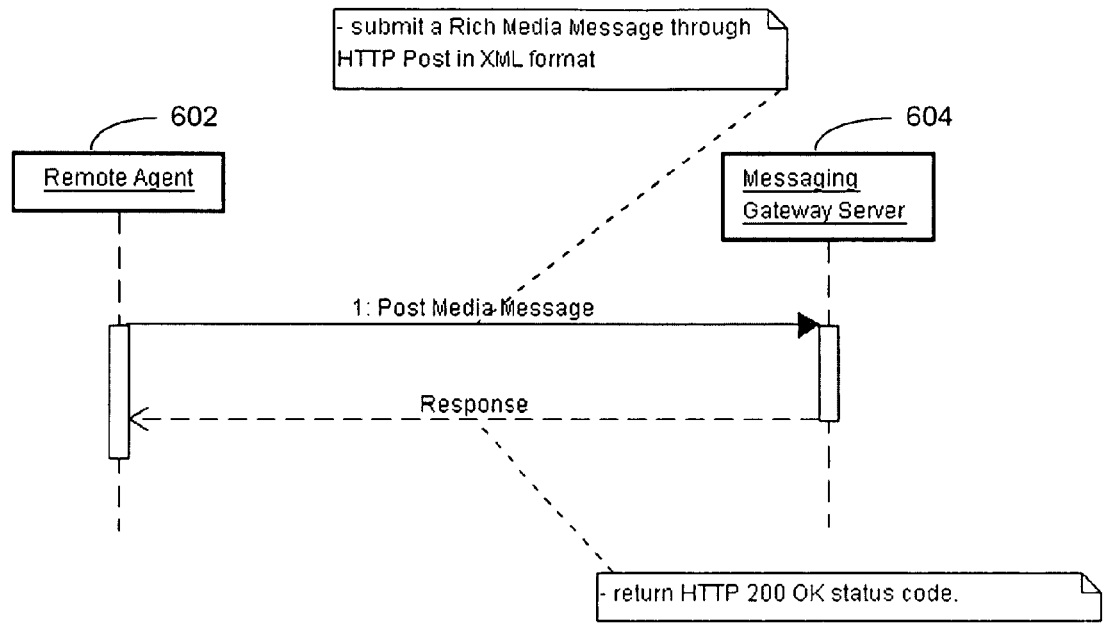
FIG. 6a illustrates a method for processing a XML encoded message through HTTP Post according to embodiments of the present invention.

FIG. 6a illustrates a method for processing a XML encoded message through HTTP Post according to embodiments of the present invention. As shown in this exemplary method, a rich media message from a remote agent 602 may be submitted to a messaging gateway server 604 by means of a post media message, where the remote agent 602 submits a rich media message through HTTP Post in XML format. In response, an OK status code (HTTP 200) may be returned from the messaging gateway server 604 after a successful submission.

To post a rich media message from the remote agent 602, the method first creates an XML representation of the rich media message for publication. An example of a rich media message is shown below.

```
<Message    xmlns="http://www.airgini.com/congee/message">
  <From>
    <UserId>4</UserId>
    <AgentId>demo</AgentId>
  </From>
  <To>
    <UserId>4</UserId>
  </To>
  <Rich>false</Rich>
  <Content>Rich Media Messaging through Remote Agent API:-)</Content>
</Message>
<Message    xmlns="http://www.airgini.com/congee/message">
  <From>
    <UserId>4</UserId>
    <AgentId>demo</AgentId>
  </From>
  <To>
    <UserId>4</UserId>
  </To>
  <Rich>true</Rich>
  <RichContent>
  <![CDATA[
  <RichContent xmlns="http://www.airgini.com/congee/rich-content"
  xmlns:xsi="http://www.w3.org/2001/XMLSchema-instance">
    <BorderColor>#808080</BorderColor>
    <Component xsi:type="rich:Text"
  xmlns:rich="http://www.airgini.com/congee/rich-content">
      <FontSize>Large</FontSize>
      <FontStyle>Bold</FontStyle>
      <Text>Touch comes to iPod</Text>
    </Component>
    . . .
    . . .
  </RichContent>
  ]]>
  </RichContent>
</Message>
```

Referring back to FIG. 2, the agent terminated (AT) message dispatching module 220 has an interface to send a rich media message to the remote agent 226 of the content/service provider 206 by means of an XML encoded message through HTTP callback. After receiving of a rich media message from the rich media message router 216, the agent terminated message dispatching module 220 module dispatches to the remote software agent 226 in XML format.

Figure 6B:
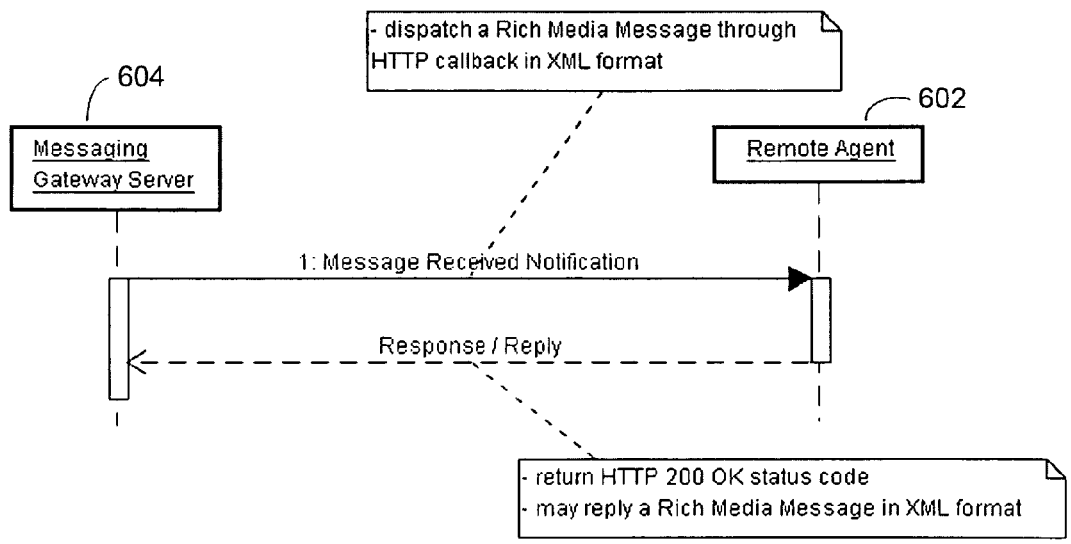
FIG. 6b illustrates a method for processing a XML encoded message through HTTP callback according to embodiments of the present invention.

FIG. 6b illustrates a method for processing a XML encoded message through HTTP callback according to embodiments of the present invention. In this exemplary method, a rich media message from a messaging gateway server 602 can be dispatched to a remote (software) agent 604 by means of a message received notification, where the messaging gateway server 604 dispatches a rich media message through HTTP callback in XML format. In response, an OK status code (HTTP 200) may be returned from the remote agent 604. The remote agent 604 may reply to the message received notification by creating a response with a rich media message encoded in XML format.

Referring back to FIG. 2, the routing of a rich media message is handled by the rich media message router 216. In various embodiments of the present disclosure, a rich media message may be submitted to the rich media message router 216 in two ways: 1) messages from mobile users are submitted through the mobile originated (MO) message processing module 212; and 2) messages from remote agents are submitted through the agent originated (AO) message processing module 218. After the receiving of message from the mobile originated (MO) message processing module 212 or from the agent originated (AO) message processing module 218, the rich media message router 216 creates a new record for the message and stores the whole message (including message header and message body) in the database server 210. In this way, rich media messages may be persisted in the database server 210 according to a binary serialization format. There can be a state associated with each persisted message, which is further described in association with FIG. 7.

Figure 7:
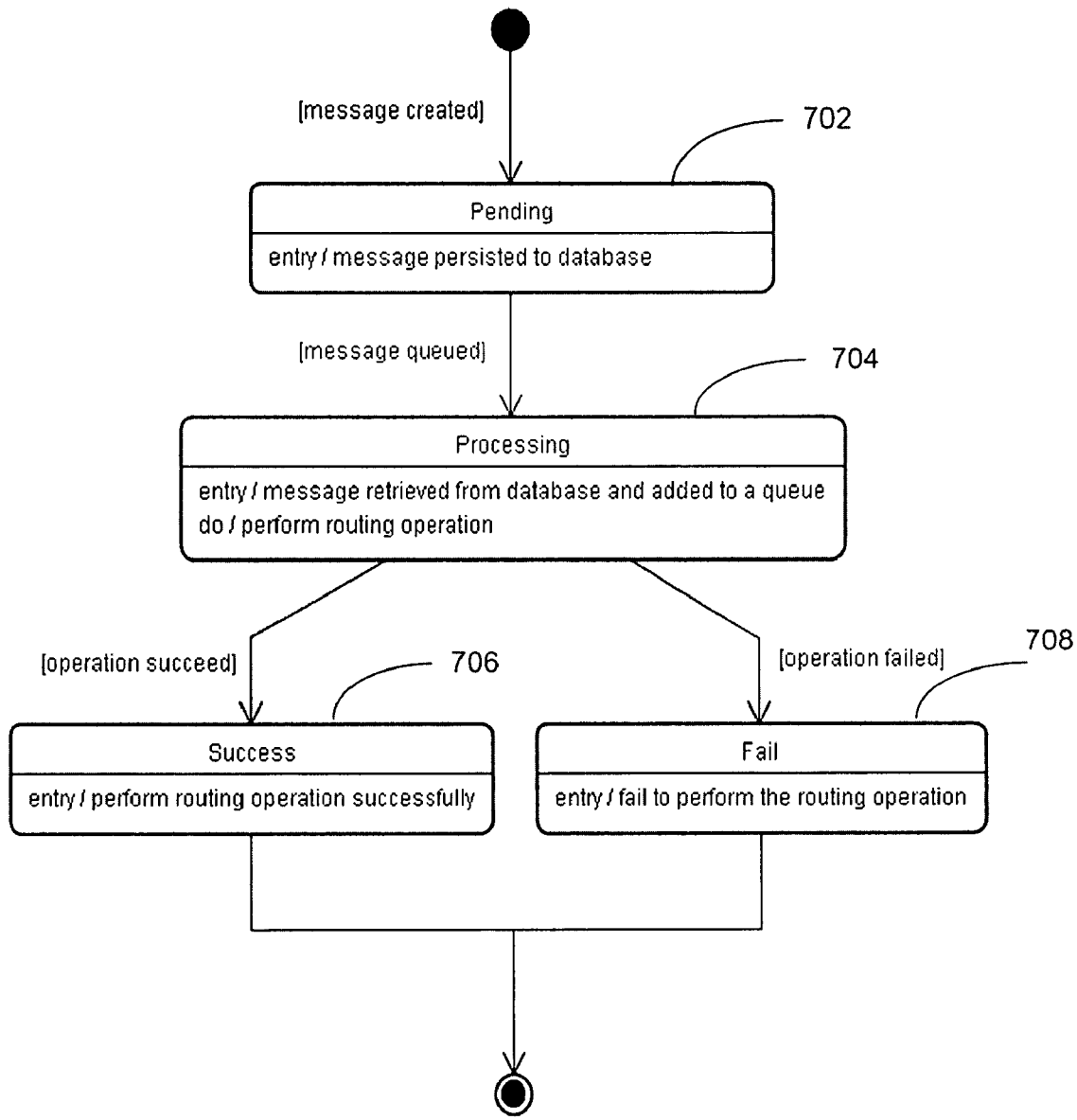
FIG. 7 illustrates exemplary states of a rich media message according to embodiments of the present invention.

FIG. 7 illustrates exemplary states of a rich media message according to embodiments of the present invention. As shown in FIG. 7, there can be a state associated with each persisted message according to embodiments of the present disclosure. Specifically, a Pending state 702 indicates a message is submitted from either the mobile originated (MO) message processing module 212 or the agent originated (AO) messaging processing module 218 to the router 216. The router 216 creates a new record for the message and persist the message into the database. An initial status of Pending is assigned to the message. A Processing state 704 indicates that for each regular cycle, messages with the status Pending are retrieved from the database. A task may be created for each retrieved message and the task is added to a queue. The message may then be updated with a status Processing. The task is waiting for an available thread from a pool in support of concurrently processing. The task performs routing operation after it acquires an available thread for execution. A Success state 706 indicates the routing operation within the task has been performed successfully. A Fail state 708 indicates the routing operation within the task has been failed.

Figure 8:
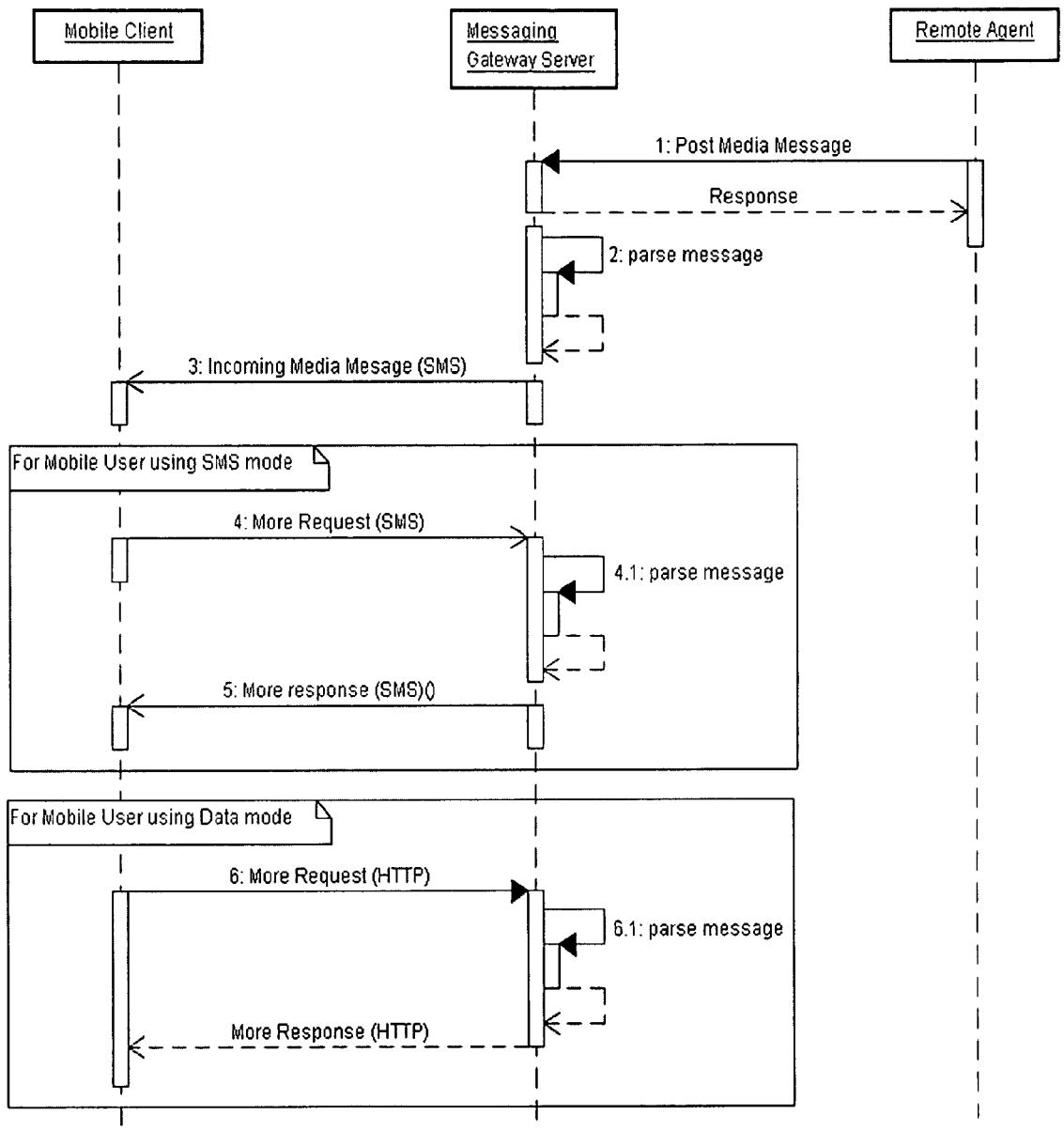
FIG. 8 illustrates a method for parsing a long rich media message according to embodiments of the present invention.

FIG. 8 illustrates a method for parsing a long rich media message according to embodiments of the present invention. As shown in FIG. 8, for a mobile user with client application installed, messages may be delivered from the messaging gateway server to the mobile client application by means of binary SMS. In order to overcome the limit of each SMS can only delivery 140 bytes of binary data, concatenated SMS may be used to deliver rich media messages to the mobile client. In one implementation, the messaging gateway server may control the use of mobile terminated SMS by using a predetermined number of SMS. For example, a maximum of three SMS may be a predetermined number. In other embodiments, a different predetermined number of SMS may be used. For a rich media message with long data content, the message may be parsed into multiple segments. In this approach, a first segment is delivered to the mobile client application. The remaining segments may be delivered to the mobile client application after explicit request from the mobile user through subsequent requests via SMS/HTTP.

According to embodiments of the present disclosure, the following algorithm can be employed for parsing and constructing of rich media messages.

---

1   message ← message model according to format of "Incoming Rich Media Message (Stream Push) (SMS)"

2   segmentNum ← index number for the desire segment $\boxed{to\ support\ more\ operation}$ 3   numSMS ← calculate num of SMS to delivery the message object $\boxed{include\ bytes\ used\ for}$ $\boxed{User\ Data\ Header\ with\ "port\ info"\ and\ "concat\ message\ info".}$ 4   if (numSMS > 3) $\boxed{perform\ parsing\ of\ message}$ 4.1   udhNumBytes ← calculate num of bytes for User Data Header of SMS with "port info" and "concat message info".

4.2   messageHeaderNumBytes ← calculate number of bytes for header information of message object 4.3   adNumBytes ← calculate num of bytes for attached advertisement $\boxed{fixed\ size}$ 4.4   availableNumBytes ← ( (140 - 1) - udhNumBytes) * 3 - messageHeaderNumBytes - adNumBytes $\boxed{calculate\ num\ of}$ $\boxed{available\ bytes\ for\ message\ content\ delivery\ through\ 3\ SMS}$ 4.5   richContent ← message.RichContent 4.6   segmentList ← create an empty list for segments 4.7   do $\boxed{parse\ Rich\ Content\ into\ multiple\ segments.\ In\ each\ cycle\ of}$ $\boxed{parsing,\ create\ a\ segment\ of\ Rich\ Content\ from\ richContent\ object}$ $\boxed{with\ the\ condition\ of\ availableNumBytes.}$ 4.7.1   richContentHeaderBytes ← write Rich Content header bytes from richContent Object 4.7.2   dialogInputBytes ← write Dialog Input bytes from richContent Object 4.7.3   totalNumBytes ← richContentHeaderBytes.length + dialogInputBytes.length 4.7.4   componentList ← create an empty list for selected components 4.7.5   foreach component in richContent.Components 4.7.5.1   componentBytes ← empty 4.7.5.2   if component is LineBreak 4.7.5.2.1   componentBytes ← write LineBreak component bytes 4.7.5.3   else if component is HorizontalRule 4.7.5.3.1   componentBytes ← write HorizontalRule component bytes

```
4.7.5.4      else if component is Text
             4.7.5.4.1   textHeaderBytes ← write Text component header bytes
                         including size, style, color, action
             4.7.5.4.2   textAvailableNumBytes ← availableNumBytes –
                         totalNumBytes – textHeaderBytes.length
             4.7.5.4.3   textContentBytes ← write Text component content bytes with
                         limit of textAvailableNumBytes split of Text component
             4.7.5.4.4   componentBytes ← textHeaderBytes +
                         textContentBytes
4.7.5.5      else if component is Image
             4.7.5.5.1   componentBytes ← write Image component bytes
4.7.5.6      else if component is Image Collection
             4.7.5.6.1   componentBytes ← write Image Collection bytes
4.7.5.7      else if component is Section
             4.7.5.7.1   componentBytes ← write Section bytes
4.7.5.8      if ( (ComponentBytes.length + totalNumBytes) <
             availableNumBytes) check whether add of additional component will
             reach limit
             4.7.5.8.1   add componentBytes to componentList
             4.7.5.8.2   totalNumBytes ← totalNumBytes +
                         componentBytes.length
   4.7.6   richContentSegment ← create Rich Content from
           richContentHeaderBytes, dialogInputBytes and componentList
   4.7.7   add richContentSegmant to segmentList
   4.7.8   richContent ← richContent - richContentSegment remove the
           parsed segments from the original Rich Content object
 4.8    until richContent is empty
 4.9    message.RichContent ← segmentList[segmentNum]
 4.10   message.segmentNum ← segmentNum
 4.11   message.TotalNumSegment ← total number of segments
 4.12   return message parsed message
5  else no need to parse the message
 5.1    return message original message
```

For mobile users without installation of client application, messages may be sent from mobile phone to the messaging gateway server with a standard SMS. Data content within a rich media message may then be converted into plain text. According to embodiments of the present disclosure, the following algorithm may be employed for converting rich media message to a standard SMS text message

```
1  message ← message model according to format of "Incoming Rich Media Message
   (Stream Push) (SMS)"
2  if (message.Content is not empty) plain text is already provided by Content/Service
   Provider
   2.1    return message.Content
3  else need to perform conversion of Rich Content
   3.1    richContent ← message .RichContent
   3.2    plainText ← create empty string
   3.3    foreach component in richContent.Components
          3.3.1   if component is LineBreak
                  3.3.1.1   plainText ← plaintext + "\n"
          3.3.2   else if component is HorizontalRule
                  3.3.2.1   if (last character in plainText != '\n') make sure start from newline
                            3.3.2.1.1  plainText ← plaintext + "\n"
                  3.3.2.2   plainText ← plaintext + "---\n"
          3.3.3   else if component is Text
                  3.3.3.1   plainText ← plaintext + component.Text
          3.3.4   else if component is Image
                  3.3.4.1   if (last character in plainText !='\n') make sure start from newline
                            3.3.4.1.1  plainText ← plaintext + "\n"
                  3.3.4.2   plainText ← plaintext +"[" + component.Label + "]\n"
          3.3.5   else if component is Image Collection
                  3.3.5.1   if (last character in plainText !='\n') make sure start from newline
                            3.3.5.1.1  plainText ← plaintext + "\n"
                  3.3.5.2   plainText ← plaintext + "[" + component.Label + "]\n"
   3.4    return plainText
```

Figure 9:
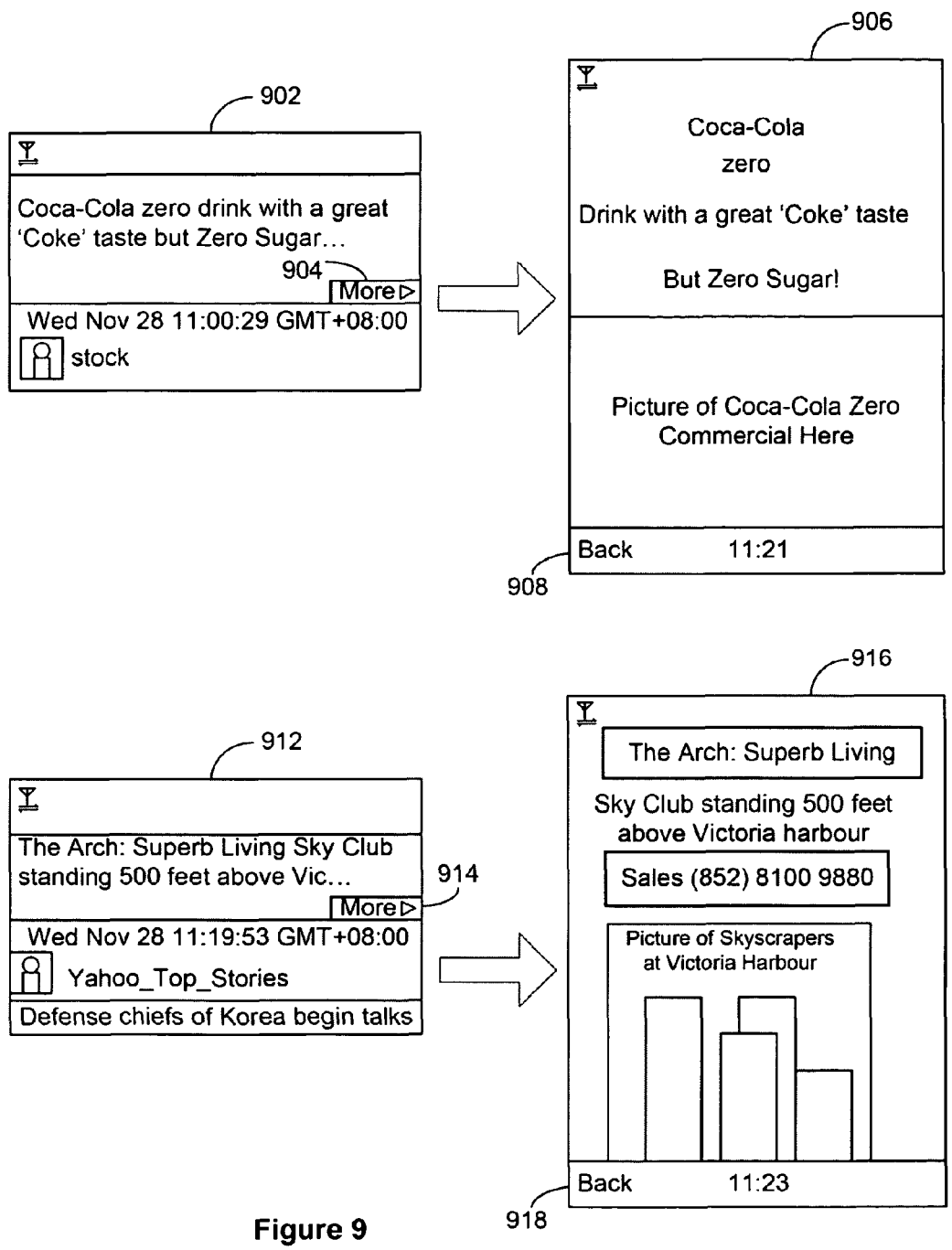
FIG. 9 illustrates a method for delivering advertisements to mobile devices interactively according to embodiments of the present invention.

FIG. 9 illustrates a method for delivering advertisements to mobile devices interactively according to embodiments of the present invention. In this example, the messaging gateway server attaches a corresponding advertisement to each message that is delivered to mobile users, whether or not the mobile users have client application installed in their mobile devices. The advertisement is based on the rich content model for delivering advertisements with rich data content (for example layout, color, image, action). For mobile users who do not have client application installed in their mobile devices, the advertisement is converted to plain text with the same algorithm as for rich media message as described above.

For mobile users who have client application installed in their mobile devices, a full version of the advertisement can be delivered to their mobile devices. An Ad-line is shown in the Message View 902, Mobile User can browse the detail of the advertisement by clicking a More link 904 associated with the Ad-line in the Message View 902. According to embodiments of the present disclosure, an Ad-line contains text extracted from the content of an advertisement. In the example shown in FIG. 9, an Ad-line that reads "Coca-Cola zero drink with a great 'Coke' taste . . . " is shown in the Message View 902. If the user pressed the More link 904, a full version of the advertisement is shown in the screen 906. The user may navigate back to the Message View 902 by pressing the Back link 908. Similarly, an Ad-line that reads "The Arch: Superb Living Sky Club . . . " is shown in the Message View 912. If the user pressed the More link 914, a full version of the advertisement is shown in the screen 916. The user may navigate back to the Message View 912 by pressing the Back link 918. As shown in these examples, an advertisement landing page is used to attract and engage potential customers, and the customers may share with their friends by making, the advertisement viral. Moreover, a variety of click-to-action (e.g. click-to-call, click-to-download, click-to-vote, etc.) can be used to provide to interactivity with users and which in turn can boost sales of the advertised products.

According to embodiments of the present disclosure, advertisements can be designed to conform to standard MMA (Mobile Marketing Association, www.mmaglobal.com) advertising guidelines and Google Mobile Ads format. Based on the in-context activities, interests, and locations of the users, targeted, relevant, permission-based advertisements can be delivered, and thus achieving higher effectiveness of such advertisement.

Figure 10:
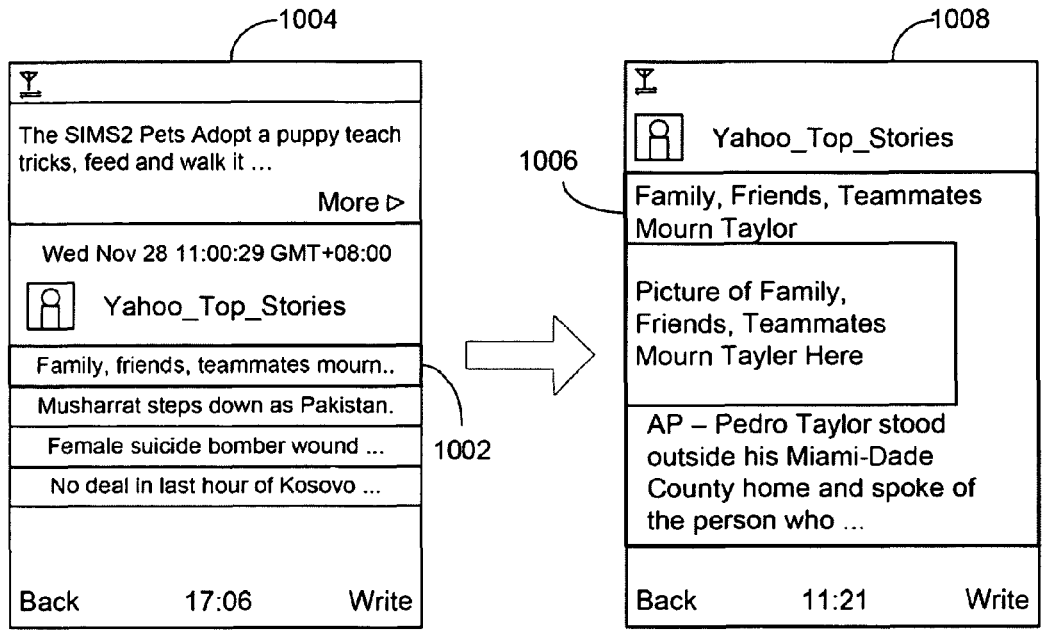
FIG. 10 illustrates an example for interactive delivery of news to mobile devices according to embodiments of the present invention.

FIG. 10 illustrates an example for interactive delivery of news to mobile devices according to embodiments of the present invention. As shown in FIG. 10, a user may click on a headline "Family, friends, teammates . . . " 1002 in a Message View 1004, to retrieve more details about the news "Family, friends, teammates mourn Taylor" 1006 as delivered and displayed on the mobile device in rich media content 1008 according to embodiments of the present disclosure. In this example, for mobile users with installation of client application, rich media messages are delivered to the mobile users with the rich content model. With the use of Text component having action type of Agent Command, the mobile client may render the Text component as an action link. The mobile user may then click on the action link to request service/content providers to perform a task. The task is performed according to an action string as defined in the Text component. The use of action string may be defined by content/service providers. A typical use of action link is to retrieve the detail of rich media data content as shown in the example of FIG. 10.

Figure 11:
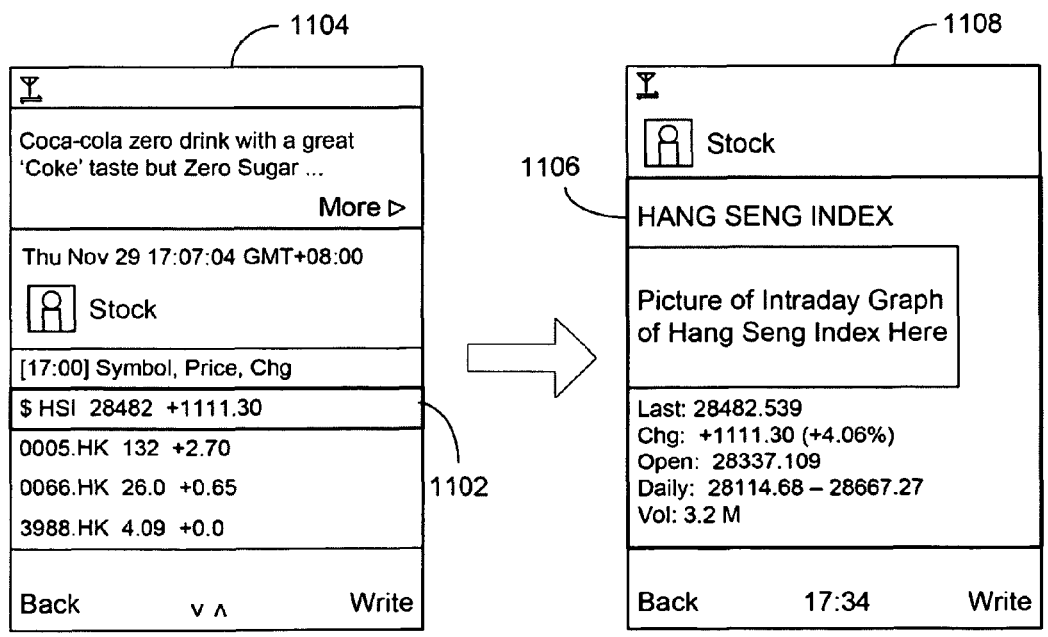
FIG. 11 illustrates an example for interactive delivery of stock information to mobile devices according to embodiments of the present invention.

FIG. 11 illustrates an example for interactive delivery of stock information to mobile devices according to embodiments of the present invention. A mobile user may click on a stock symbol from her stock portfolio to retrieve more detail information about a stock. In this example, the user may click on the stock symbol "HSI" 1102 on the left screen 1104, to retrieve more details about the stock "Hang Seng Index" 1106 as delivered and displayed on the mobile device in rich media content as shown on the right screen 1108 according to embodiments of the present disclosure.

Figure 12:
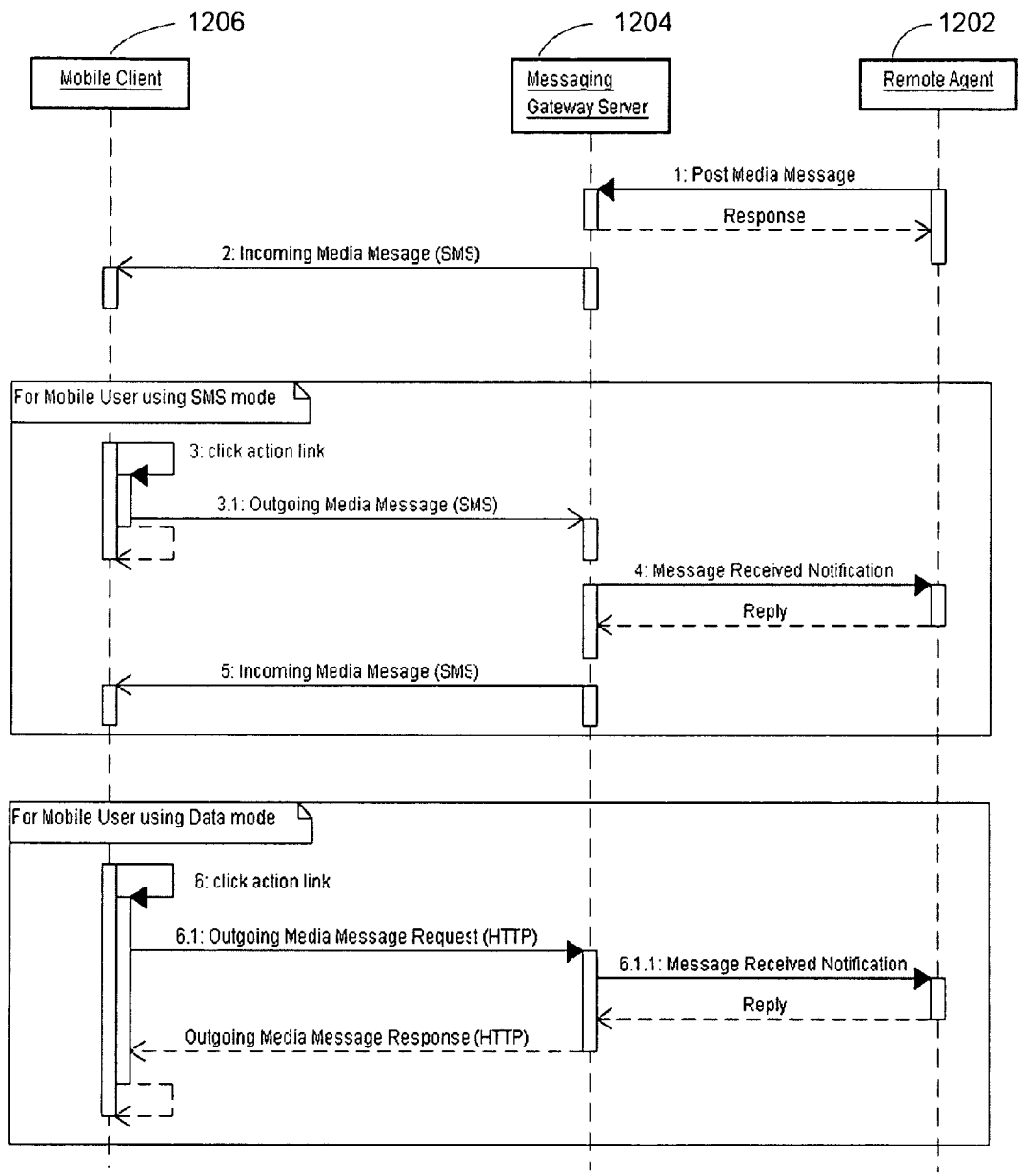
FIG. 12 illustrates a method for interacting between a mobile client and a remote agent through an action link according to embodiments of the present invention.

FIG. 12 illustrates a method for interacting between a mobile client and a remote agent through an action link according to embodiments of the present invention. In the exemplary flow diagram as shown in FIG. 12, in step 1, a remote agent 1202 posts a rich media message request to a messaging gateway server 1204, and the messaging gateway server 1204 sends a response to acknowledge the request from the remote agent 1202. In step 2, the messaging gateway server 1204 sends an incoming rich media message (SMS) to a mobile client 1206.

In response, if the mobile user is using standard SMS mode, in step 3, the mobile user may click the action link on the message. In step 3.1, the mobile client 1206 sends an outgoing rich media message (SMS) to the messaging gateway server 1204 with plain content tilled with action string. For example, the action string of News Agent as shown in the example of FIG. 10 is an identifier of news. The mobile client 1206 may copy the action string and fill the plain content of rich media message. In step 4, the messaging gateway server 1204 performs a callback on the remote agent 1202 through a message received notification. After the completion of requested task according to the action string, the remote agent 1202 makes a synchronous reply to the messaging gateway server 1204 with rich media message. In step 5, the messaging gateway server 1204 may delivery the reply message to the mobile client in an asynchronous manner through an incoming rich media message (SMS).

Alternatively, if the mobile user is using data mode, in step 6 after receiving the incoming rich media message (SMS) in step 2, the mobile user may click on the action link to retrieve the message. In step 6.1, the mobile client 1206 sends an outgoing rich media message request (HTTP) to the messaging gateway server 1204 with plain content filled with action string. For example, the action string of a Stock Agent as shown in the example of FIG. 21 is a stock symbol. The mobile client 1206 copies the action string and fills the plain content of rich media message with a stock symbol, for example HSI. In step 6.1.1, the messaging gateway server 1204 performs a callback on the remote agent 1202 through a message received notification. After the completion of requested task according to the action string, the remote agent 1202 makes a synchronous reply to the messaging gateway server 1204 with a rich media message. The messaging gateway server 1204 may then deliver the reply message to the mobile client 1206 in a synchronous manner through an outgoing rich media message response (HTTP).

Figure 13:
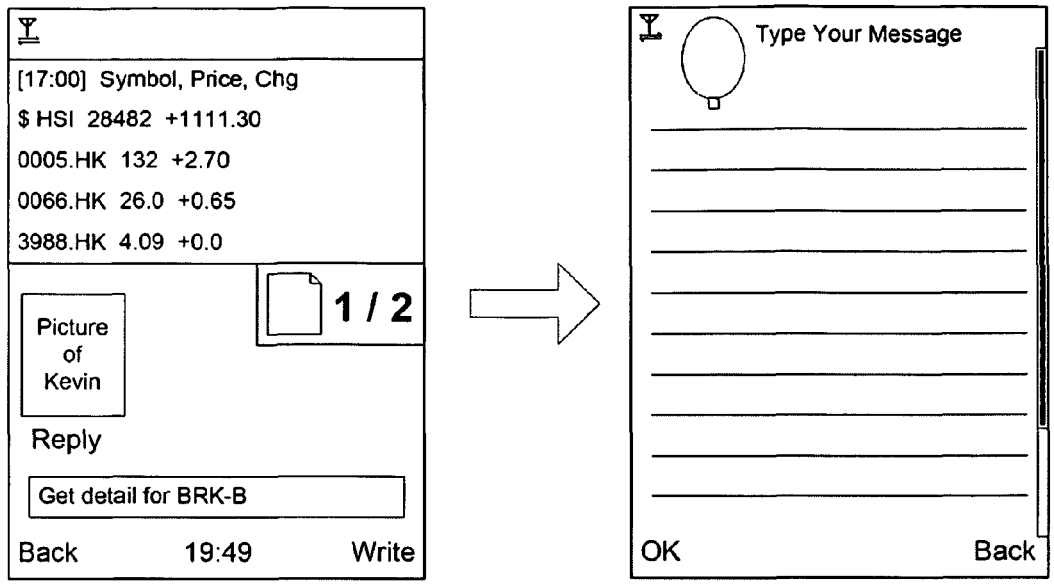
FIG. 13 illustrates exemplary use of a conversation template as an interface according to embodiments of the present invention.
Figure 13:
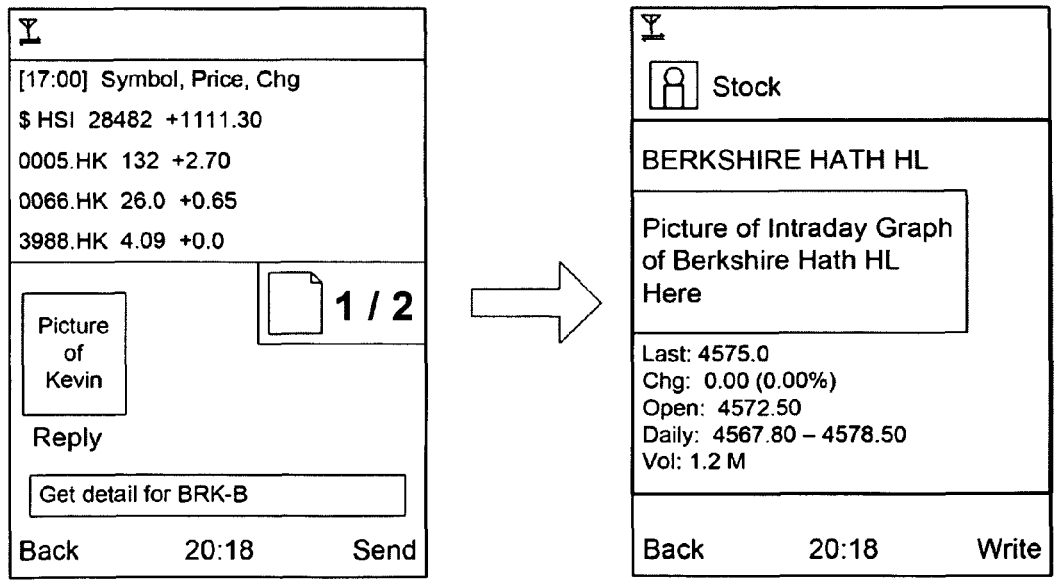

FIG. 13 illustrates exemplary use of a conversation template as an interface according to embodiments of the present invention. In the example of FIG. 13, for mobile users with installation of client application, rich media messages are delivered to the mobile users with a rich content model. With the use of a dialog input within the rich content model, the mobile client renders the dialog input as a "conversation template". Specifically, mobile users may provide input value according to formats of the conversation template for requesting service/content providers to perform a task. The task is performed according to an instruction name and a list of parameters as defined in the dialog input. Three types of parameters used to obtain user inputs may include:

String—rendered as a input box of the mobile client to accept text value

String enumeration—rendered as a combination box in the mobile client to perform value selection from a list of option Date—rendered as a formatted input box of the mobile client to accept date value.

Figure 14:
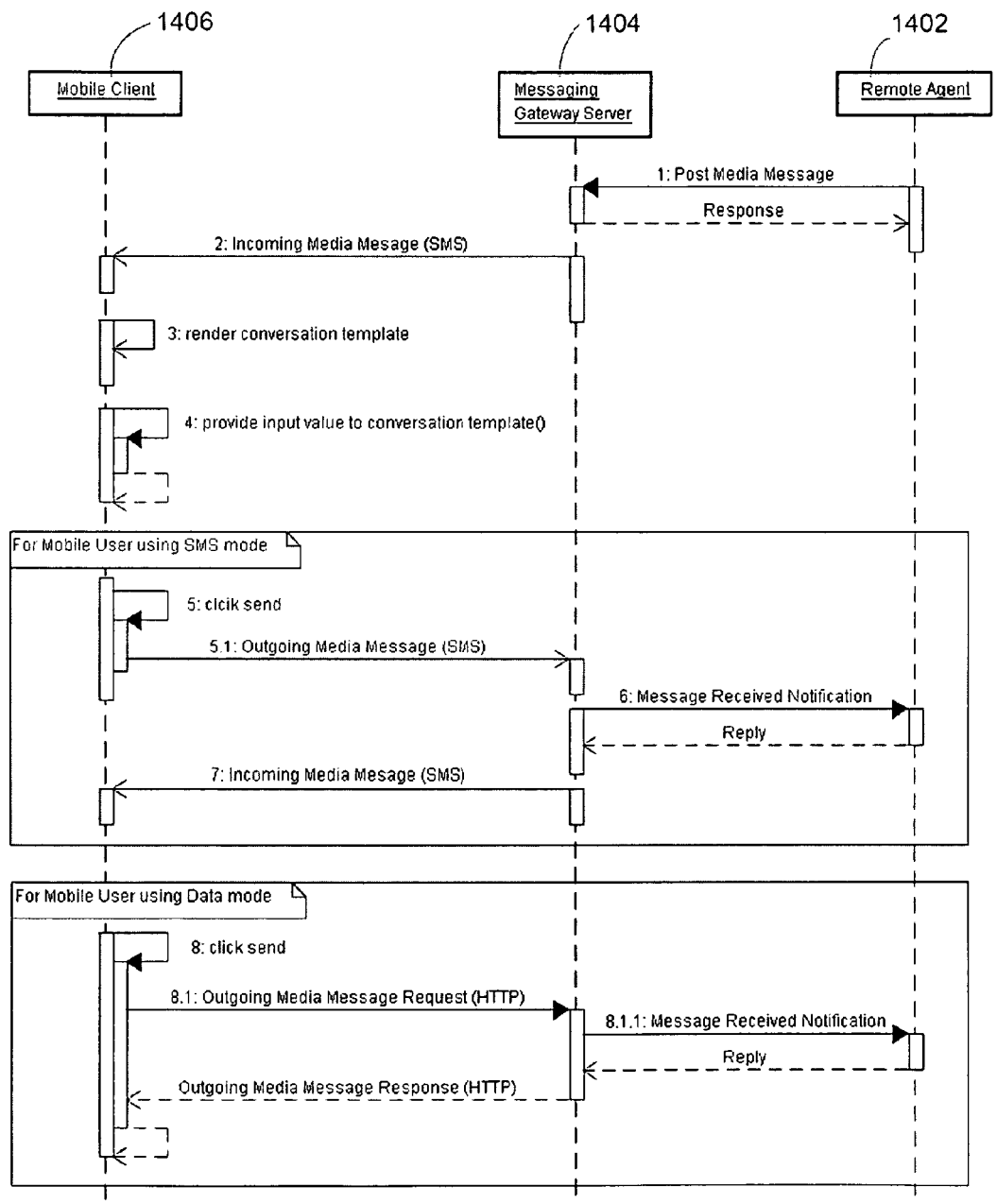
FIG. 14 illustrates a flow diagram for interacting with a remote agent through a conversation template according to embodiments of the present invention.

FIG. 14 illustrates a flow diagram for interacting with a remote agent through a conversation template according to embodiments of the present invention. In the exemplary flow diagram as shown in FIG. 14, in step 1, a remote agent 1402 posts a rich media message request to a messaging gateway server 1404, and the messaging gateway server 1404 sends a response to acknowledge the request from the remote agent 1402. In step 2, the messaging gateway server 1404 sends an incoming rich media message (SMS) to a mobile client 1406. In step 3, the mobile client 1406 renders a conversation template according to a dialog input within a rich content model in response to the incoming rich media message from the messaging gateway server 1404. In step 4, mobile user provides input values to the conversation template through the mobile client 1406.

In one approach, if the mobile user is using SMS mode, in step 5, the mobile user may click on the action link on the message. In step 5.1, the mobile client 1406 sends an outgoing rich media message (SMS) to the messaging gateway server 1404 with plain content filled with command according to the dialog input. For example, the command of Stock Agent can be created from the instruction name and a list of parameters as defined in the dialog input. In step 6, the messaging gateway server 1404 may perform a callback on the remote agent 1402 through a message received notification. After the completion of the requested task, the remote agent makes a synchronous reply to the messaging gateway server 1404 with a rich media message. In step 7, the messaging gateway server 1404 may deliver the reply message to the mobile client in an asynchronous manner through an incoming rich media message (SMS).

Alternatively, if the mobile user is using data mode (e.g. with client application installed), in step 8, the mobile user may click on the action link of the message. In step 8.1, the mobile client 1406 sends an "outgoing rich media message (SMS)" to the messaging gateway server 1404 with plain content filled with command according to a dialog input. For example, the command of a Stock Agent may be created from the instruction name and a list of parameters as defined in the dialog input. In step 8.1.1, the messaging gateway server 1404 performs a callback on the remote agent 1402 through a message received notification. After the completion of requested task, the remote agent 1402 makes a synchronous reply to the messaging gateway server 1404 with a rich media message. The messaging gateway server may then deliver the reply message to the mobile client in a synchronous manner through an outgoing rich media message response (HTTP).

Figure 15:
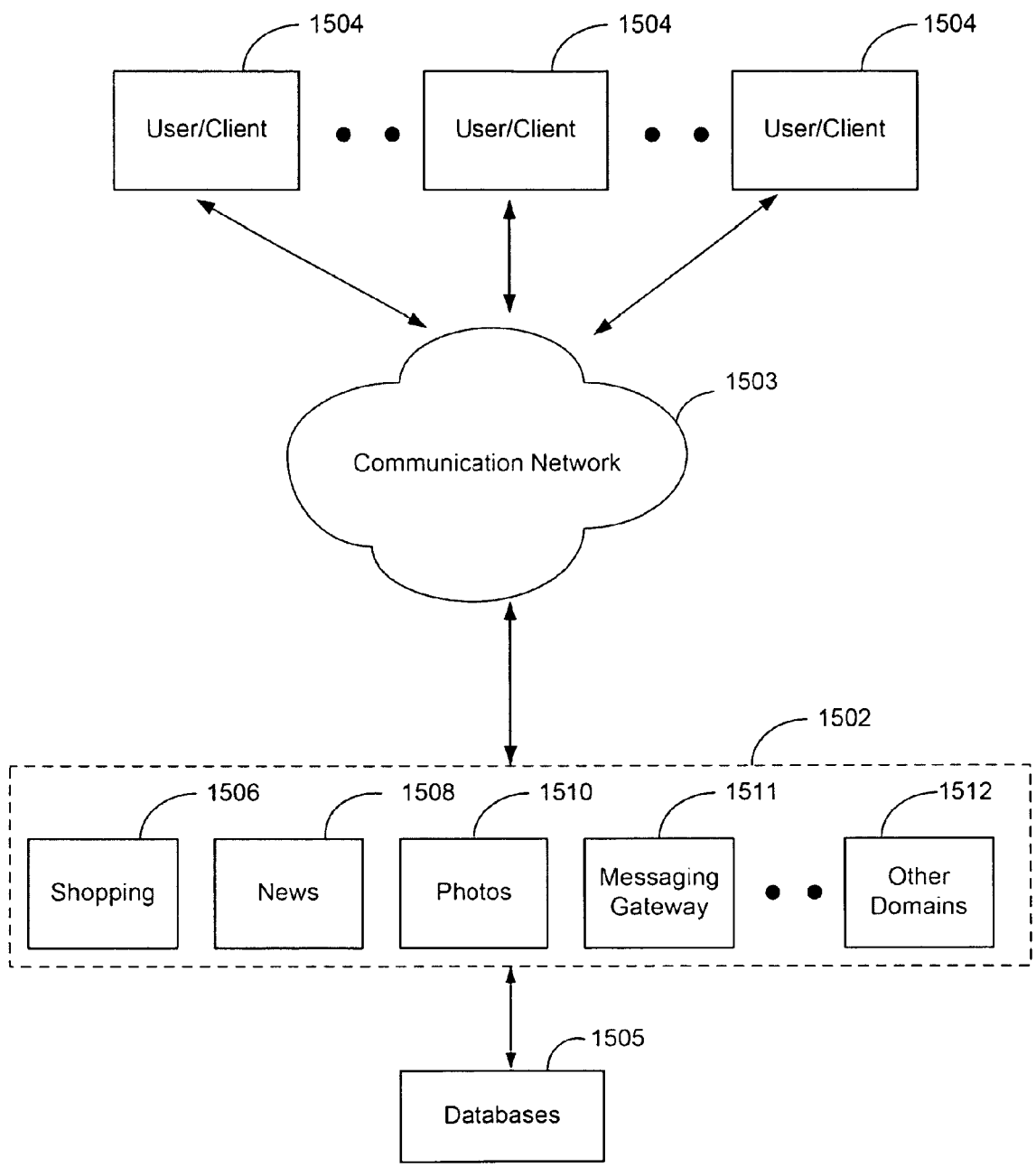
FIG. 15 illustrates a system for interactive delivery of data content to mobile devices according to embodiments of the present invention.

FIG. 15 illustrates a system for interactive delivery of data content to mobile devices according to embodiments of the present invention. The system includes one or more Internet content provider servers 1502, databases 1505, and one or more clients 1504. The servers 1502 interface with the clients 1504 via a communication network 1503. The Internet content provider servers 1502 are host servers operable to provide content to clients 1504 via the network 1503. One or more of the servers host web sites and include the news and search functions. The databases 1505 are operable to store data provided by the servers 1502 and/or clients 1504. The databases can communicate with the servers 1502 or clients 1504 via the network 1503. The databases can store data items included in the web pages, such as news pages.

Alternatively, the servers 1502 may include the databases, processors, switches, routers, interfaces, and other components and modules. Each of the servers 1502 may comprise one or more servers, or may be combined into a lesser number of servers than shown, depending on computational and/or distributed computing requirements. The servers 1502 may be located at different locations relative to each other. The databases may also be separately connected to the servers 1502. There may be more or less than two databases, depending on computational and/or distributed computing requirements. The databases may be located at different locations relative to each other and the servers 1502.

Each of the clients 1504 may be a general purpose computer, such as a personal computer, having a central processing unit (CPU), a memory, an input device, and an output device. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 1504. Clients 1504 include one or more applications, program modules, and/or sub-routines. As an example, clients 1504 may include a browser application (e.g., Internet Explorer, etc.) and a graphical user interface (GUI) to access web sites and web pages provided by the servers 1502 and data stored at the databases 1505. Clients 1504 may be remote from each other, the servers 1502, and/or the databases.

The network 1503 is a communications network, such as a local area network (LAN), a wide area network (WAN), telecommunication network, or the Internet. When the network 1503 is a public network, security features (e.g., VPN/SSL secure transport) may be included to ensure authorized access within the system.

The servers 1502 further include a plurality of individual domains, for example, shopping domain 1506, news domain 1508, photos domain 1510, messaging gateway 1511, and other domains 1512. A domain is a computer system implemented with different hardware and software for a specific application, such as the shopping applications, news applications, and photo applications. Other domains may include games, finance, weather, and search. These applications implement Web 2.0 functionalities using a combination of HTML, CSS, JavaScript and "Asynchronous JavaScript and XML" (AJAX).

According to embodiments of the present disclosure, the methods and systems described above for interactively delivery of multimedia contents can be applied to serve an advertiser-sponsored social network for mobile users. This form of social web aggregation service can work with any mobile phones, even with the phones that do not have mobile web access capabilities. This service can provide users with rich media contents that they want to receive in exchange with unobtrusive, relevant, and permission-based advertisement. In one approach, using a push mechanism, users can receive updates from their friends' profiles on social sites from the World Wide Web. The rich media contents may be automatically delivered into a single personal hub on their mobile phones, which in turn save users time and effort in retrieving such information.

In addition, the methods and systems described above may be used to bridge users closer to their friends and family, and allowing users to stay in touch with the information they care about. With the availability of the Internet, people are constantly generating contents to be shared with their friends and family, such as updating Facebook profiles, posting to blogs, sharing file reviews, or requesting recommendations for products and services. The methods and systems described above may be applied to automatically deliver rich media contents to be shared by multiple users on their mobile device, and thus creates a conversation hub on a certain topic among the users. The ability to automatically deliver rich media contents to mobile devices provides a convenient way for users to stay connected to each other without visiting multiple websites or web services, such as Facebook, Blogger, Flickr, LinkedIn, and Twitter. This ability can also support an info-buddies eco-system that users may engage with their favorite web services, for example Yahoo news, eBay alert, FedEx tracker, and Nike+ Training.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for interactive delivery of data content to mobile devices, comprising:
    receiving a rich media message to be transmitted to a mobile device, wherein the rich media message includes multimedia data;
    determining a mode of data communication of the mobile device;
    parsing the rich media message into one or more text SMS (short message service) messages in response to a determination that the mobile device is capable of processing only text SMS messages; and
    transmitting the one or more text SMS messages to the mobile device, wherein the one or more SMS messages includes a click-to-action configured to provide interactivity with the mobile device.

2. The method of claim 1 further comprising:
    parsing the rich media message into one or more SMS messages in response to a determination that the mobile device is capable of processing binary SMS messages; and
    transmitting the one or more binary SMS messages to the mobile device.

3. The method of claim 1 further comprising:
    parsing the rich media message into one or more HTTP (hyper text transmission protocol) messages in response to a determination that the mobile device is capable of processing HTTP messages; and
    transmitting the one or more HTTP messages to the mobile device.

4. The method of claim 1, wherein the rich media message comprises a message header, and wherein the message header includes a sender identifier, a receiver identifier, a message identifier, a reference to the message identifier, a timestamp, a segment number, a total number of segment indicator, and a rich content indicator.

5. The method of claim 1, wherein the rich media message comprises a message body, and wherein the message body includes a rich content section containing an encoded multimedia message.

6. The method of claim 4 further comprising:
    receiving a request from the mobile device for additional data;
    processing the request in accordance with the message ID, the segment number, and the total number of segment indicator of the message header;
    retrieving the additional data from a content provider; and
    delivering the additional data to the mobile device, wherein the additional data includes targeted permission-based advertisements based on in-context activities and location of the mobile device.

7. The method of claim 1 further comprising:
    authenticating a source of the rich media message to determine whether the rich media message is sent from a trusted source, wherein the trusted source includes at least one of:
    another mobile device having a permission to communicate with the mobile device; and
    a content provider having a permission to communicate with the mobile device.

8. The method of claim 1, wherein the rich media message comprises at least one of the following:
    an advertisement;
    a stock quote;
    a sports score;
    a weather report;
    a traffic report;
    a news report; and
    an email message.

9. The method of claim 1, wherein the rich media message comprises at least one of the following:
    an update from a social network;
    a shared message from the social network; and
    a direct message from another user in the social network.

10. A computer program product for interactive delivery of data content to mobile devices, comprising:
    a non-transitory medium storing executable program code, wherein the program code comprises:
    code for receiving a rich media message to be transmitted to a mobile device, wherein the rich media message includes multimedia data;

code for determining a mode of data communication of the mobile device;

code for parsing the rich media message into one or more text SMS messages in response to a determination that the mobile device is capable of processing only text SMS messages; and code for transmitting the one or more text SMS messages to the mobile device, wherein the one or more SMS messages includes a click-to-action configured to provide interactivity with the mobile device.

11. The computer program product of claim 10 further comprising:

code for parsing the rich media message into one or more binary SMS messages in response to a determination that the mobile device is capable of processing binary SMS messages; and code for transmitting the one or more binary SMS messages to the mobile device.

12. The computer program product of claim 10 further comprising:

code for parsing the rich media message into one or more HTTP messages in response to a determination that the mobile device is capable of processing HTTP messages; and code for transmitting the one or more HTTP messages to the mobile device.

13. The computer program product of claim 10, wherein the rich media message comprises a message header, and wherein the message header includes a sender identifier, a receiver identifier, a message identifier, a reference to the message identifier, a timestamp, a segment number, a total number of segment indicator, and a rich content indicator.

14. The computer program product of claim 10, wherein the rich media message comprises a message body, and wherein the message body includes a rich content section containing an encoded multimedia message.

15. The computer program product of claim 13 further comprising:

code for receiving a request from the mobile device for additional data;

code for processing the request in accordance with the message ID, the segment number, and the total number of segment indicator of the message header;

code for retrieving the additional data from a content provider; and code for delivering the additional data to the mobile device, wherein the additional data includes targeted permission-based advertisements based on in-context activities and location of the mobile device.

16. The computer program product of claim 10 further comprising:

code for authenticating a source of the rich media message to determine whether the rich media message is sent from a trusted source, wherein the trusted source includes at least one of:

another mobile device having a permission to communicate with the mobile device; and a content provider having a permission to communicate with the mobile device.

17. The computer program product of claim 10, wherein the rich media message comprises at least one of the following:

an advertisement;

a stock quote;

a sports score;

a weather report;

a traffic report;

a news report; and an email message.

18. The computer program product of claim 10, wherein the rich media message comprises at least one of the following:

an update from a social network;

a shared message from the social network; and a direct message from another user in the social network.

19. A system for interactive delivery of data content to mobile devices, comprising:

a mobile originated message processing module configured to receive messages from mobile devices via at least one of HTTP, binary SMS, and text SMS formats;

a mobile terminated message dispatching module configured to transmit messages to mobile devices via at least one of binary SMS and text SMS formats in an asynchronous manner;

an agent originated message processing module configured to receive messages to from content or service providers via the HTTP format in a synchronous manner;

an agent terminated message dispatching module configured to transmit messages to the content or service providers via the HTTP format; and a media message router module configured to bridge communications among the mobile originated message processing module, the mobile terminated message dispatching module, the agent originated message processing module, the agent terminated message dispatching module, and a database server.

20. The system of claim 19, wherein the mobile originated message processing module further comprises:

a decoder module configured to decode at least one of binary encoded messages received through HTTP post, binary encoded messages through binary SMS, and text messages through text SMS.

21. The system of claim 19, wherein the mobile terminated message dispatching module further comprises:

an encoder module configured to encode at least one of binary SMS messages and text SMS messages.

22. The system of claim 19, wherein the agent originated message processing module further comprises:

a decoder module configured to decode XML encoded messaged received through HTTP post.

23. The system of claim 19, the agent terminated message dispatching module further comprises:

a decoder module configured to decode XML encoded messaged received through HTTP callback.

* * * * *